United States Patent
Dhruwdas

(10) Patent No.: US 10,217,217 B2
(45) Date of Patent: Feb. 26, 2019

(54) SYSTEMS AND METHODS FOR OBTAINING 3-D IMAGES FROM X-RAY INFORMATION

(71) Applicant: Indian Institute of Technology, Bombay, Mumbai (IN)

(72) Inventor: Karade Vikas Dhruwdas, Pune (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 0 days.

(21) Appl. No.: 15/655,863

(22) Filed: Jul. 20, 2017

(65) Prior Publication Data
US 2017/0323443 A1    Nov. 9, 2017

Related U.S. Application Data

(63) Continuation of application No. PCT/IN2016/000021, filed on Jan. 20, 2016.

(30) Foreign Application Priority Data

Jan. 20, 2015  (IN) .......................... 199/MUM/2015

(51) Int. Cl.
G06K 9/00       (2006.01)
G06T 7/00       (2017.01)
G06T 11/00      (2006.01)

(52) U.S. Cl.
CPC ........ G06T 7/0012 (2013.01); G06K 9/00208 (2013.01); G06T 11/006 (2013.01);
(Continued)

(58) Field of Classification Search
CPC ....... A61B 6/037; A61B 6/5235; A61B 6/585; G06T 7/0028; G06T 11/60; G06K 9/20; G06K 9/4642; G01T 1/1648
See application file for complete search history.

(56) References Cited

U.S. PATENT DOCUMENTS 7,065,242 B2 *  6/2006  Petrov ...................... G06K 9/20
                                                    345/420
2002/0106052 A1    8/2002  Menhardt
(Continued)

FOREIGN PATENT DOCUMENTS

CN    1462016       12/2003
CN    1883415       12/2006
CN    101371789      2/2009

OTHER PUBLICATIONS

WIPO, Written Opinion in corresponding PCT Application PCT/IN2016/000021, dated Jul. 13, 2016.
(Continued)

*Primary Examiner* — Duy M Dang
(74) *Attorney, Agent, or Firm* — Ryan Alley IP

(57) ABSTRACT

Methods, hardware, and software transform 2D anatomical X-ray images into 3D renderings for surgical preparation. X-ray images of a body part are identified by camera model. A contour is extracted from the X-ray. Each anatomical region of the contour is assigned 2D anatomical values. A separate 3D template for the body part is modified to match the X-ray image by extracting silhouette vertices from the template and their projections. The template is aligned with the x-ray image and projected on an image plane to obtain a 2D projection model. The template is modified to match the anatomical values by comparing the projection with the corresponding anatomical values. Best matching points on the contour for extracted silhouette vertex projections are identified and used to back-project corresponding silhouette vertices. The 3D template is deformed so that its silhouette vertices match the target positions, resulting in a 3D reconstruction for the X-ray image.

26 Claims, 18 Drawing Sheets

(52) U.S. Cl.
 CPC ............. *G06K 2209/055* (2013.01); *G06T 2207/10116* (2013.01); *G06T 2207/30008* (2013.01); *G06T 2210/41* (2013.01)

(56) References Cited

U.S. PATENT DOCUMENTS

| | | |
|---|---|---|
| 2004/0008882 A1 | 1/2004 | Hornegger et al. |
| 2005/0105679 A1 | 5/2005 | Wu et al. |
| 2006/0285638 A1 | 12/2006 | Boese et al. |

OTHER PUBLICATIONS

WIPO, International Search Report in corresponding PCT Application PCT/IN2016/000021, dated Jul. 21, 2016.

\* cited by examiner

* Anatomical Parameters

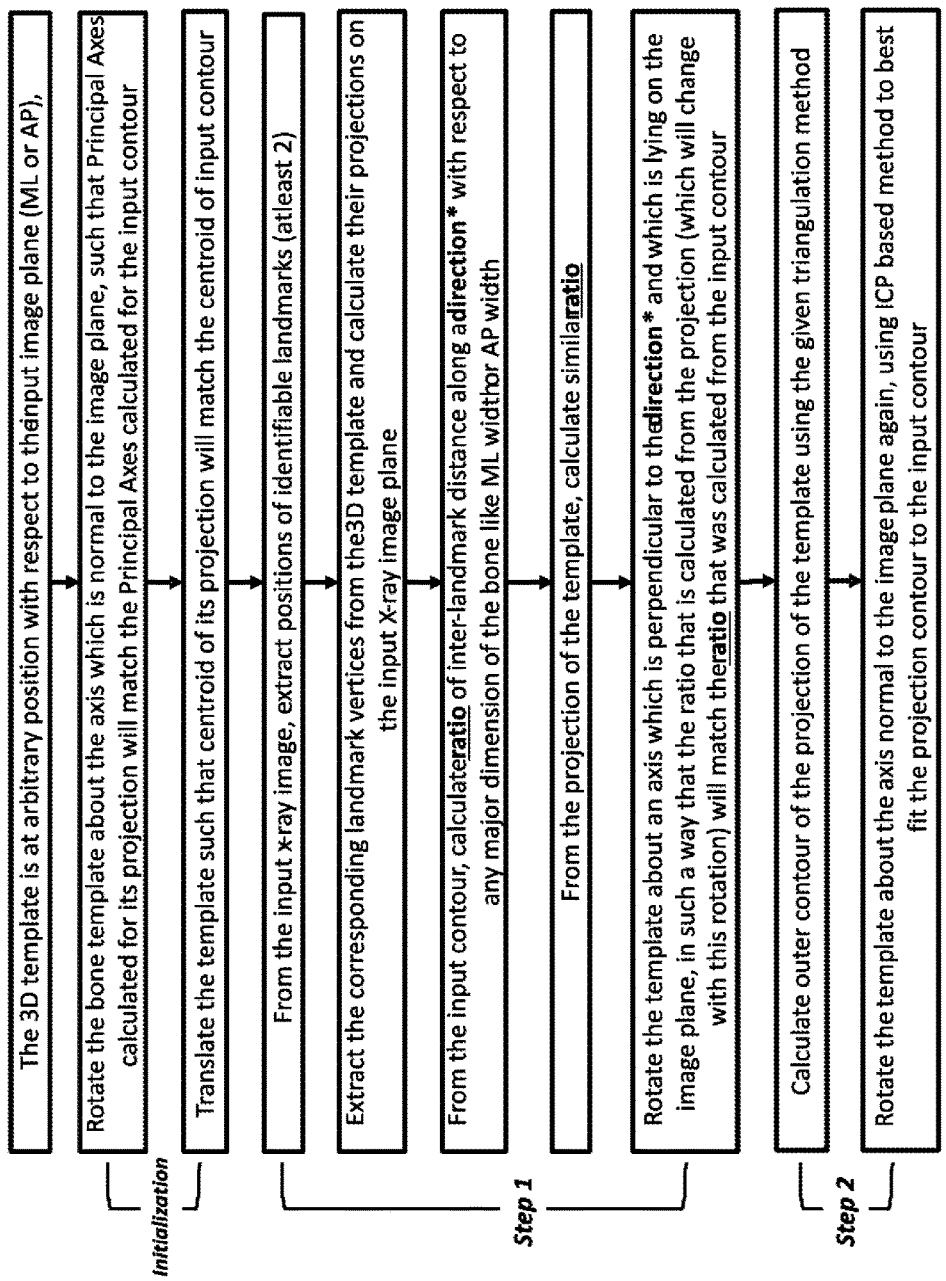

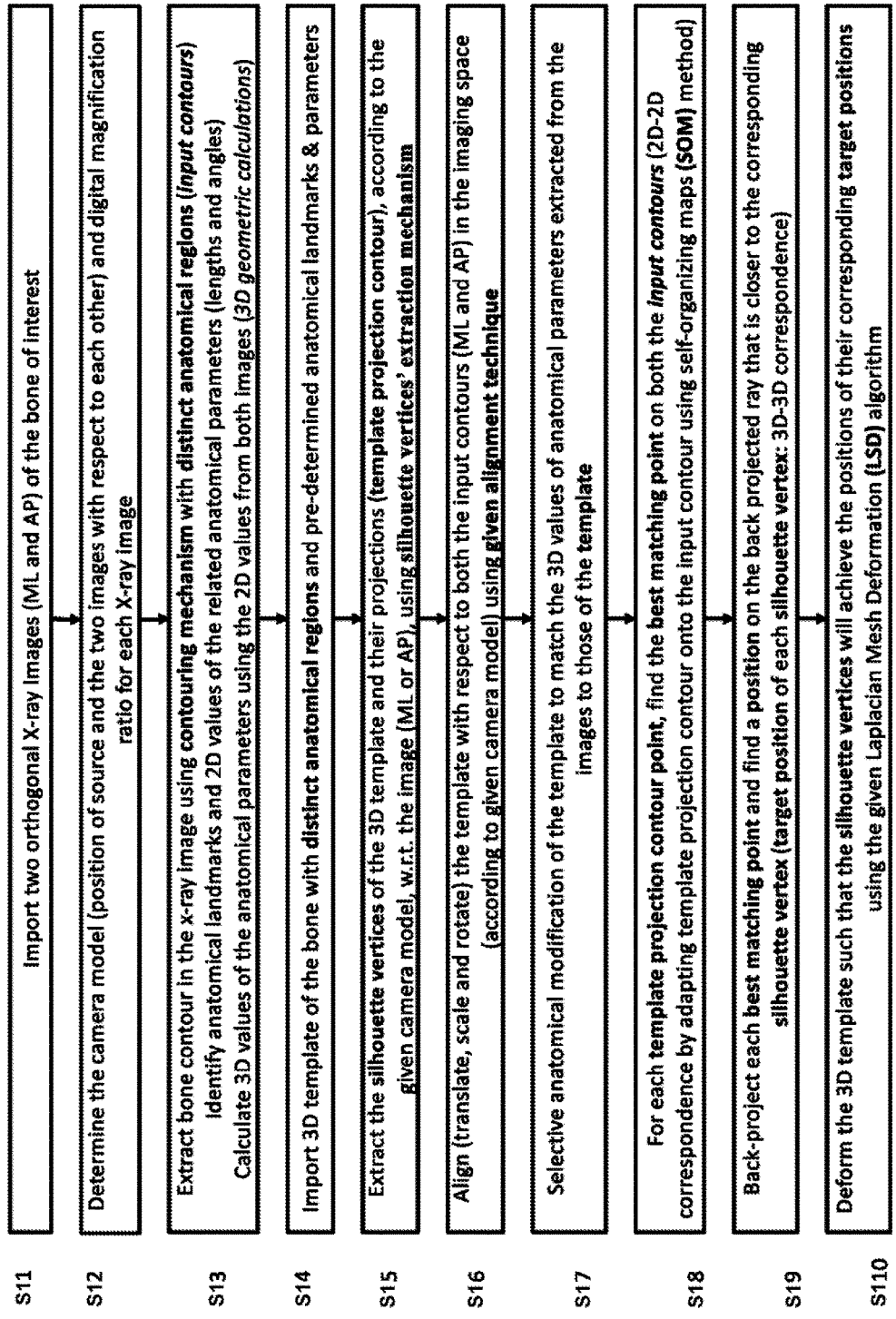

SYSTEMS AND METHODS FOR OBTAINING 3-D IMAGES FROM X-RAY INFORMATION

RELATED APPLICATIONS

This application claims priority under 35 U.S.C. § 120 to, and is a continuation of, co-pending International Application PCT/IN2016/000021, filed Jan. 20, 2016 and designating the US, which claims priority to Indian Application 199/MUM/2015, filed Jan. 20, 2015, such Indian Application also being claimed priority to under 35 U.S.C. § 119. These Indian and International applications are incorporated by reference herein in their entireties.

BACKGROUND

Surgical planning is a preoperative method of visualising a surgical intervention, to set out the surgical steps and bone segment navigation in the context of computer assisted surgery. Surgical planning is important in orthopedic surgery, neurosurgery, oral and maxillofacial surgery, etc. Execution, or transfer of the surgical planning to the patient, is generally performed with a medical navigation system.

Some orthopedic surgeries, like knee or hip replacement, include cutting or drilling on an irregular-shaped a bone. Performance and accuracy of such surgeries improves if the surgery is planned pre-operatively. Surgeons are trained to use conventional 2D image data to prepare for their complex procedures. Such planning may be made from X-ray images of CT data sets or the like. CT data sets are large compared to X-ray images. Hard copies of X-ray images of the particular region of the patient's body for operation, such as a knee or hip-joint, or digital X-ray images on a PC based, cn be used for 2D operational planning.

SUMMARY

Example embodiments include computer systems for transforming 2D anatomical X-ray images into 3D renderings for surgical preparation through example methods. Such methods include taking x-ray image of body part to be converted to 3D and determining a camera model of the x-ray image. For example, spatial values of the X-ray source and body part may indicate the camera model. A contour of the body part is extracted from the X-ray and analyzed based on its anatomical regions. Each region is assigned 2D anatomical values in the contour. A separate 3D template for the body part is then modified to match the 2D X-ray images by extracting silhouette vertices from the 3D template and their projections, according to the camera model and how those features are initially aligned in the template. The template can then be aligned with the x-ray image and projected on an image plane for the appropriate camera model to obtain a 2D projection model. The template is then modified to match the 2D anatomical values by comparing the 2D projection with the corresponding identified anatomical values. A best matching point on the contour, for each extracted silhouette vertex projection, is identified between the 2D projection and contour. The resulting matching points are then back projected based on camera model to form a back projected ray with target positions that are closest to a corresponding silhouette vertex. The 3D template can then be deformed so that its silhouette vertices match the target positions, resulting in a 3D image that corresponds to the 2D X-ray image.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

FIG. 13 is a flowchart of an example method of determining alignment of the template with respect to the input x-ray image.

FIG. 14 is a flowchart of an example method of 3D image reconstruction from a two Orthogonal X-ray image.

DETAILED DESCRIPTION

Figure 1:
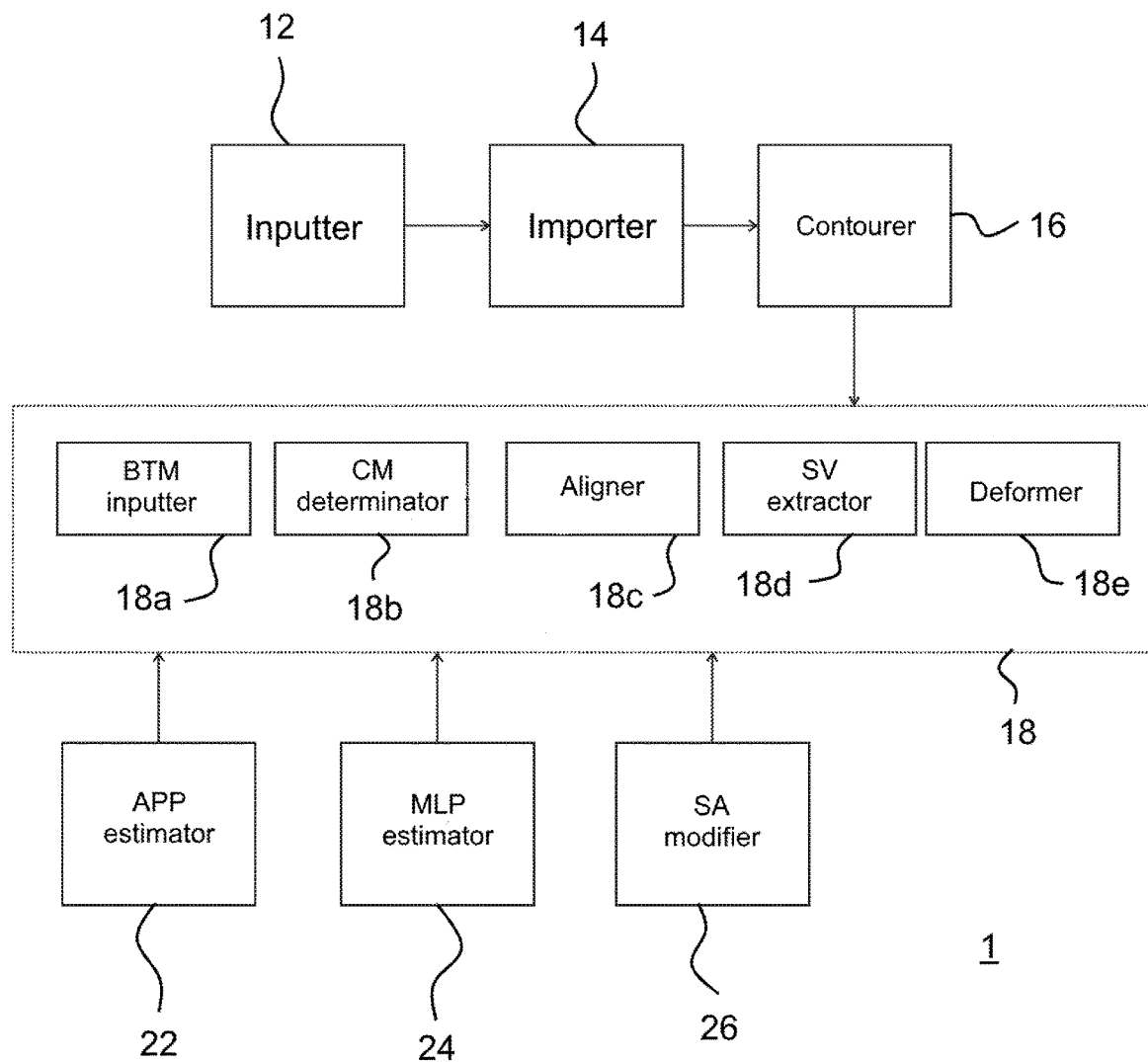
FIG. 1 is an illustration of a schematic block diagram of an example embodiment system.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or"

includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

As used herein, "3D" means 3-dimensional, while "2D" means 2-dimensional. The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

The inventors have recognized that even well-trained surgical planners can struggle with limited information that is available in 2D surgical planning and/or without trying multiple approaches in planning prior to the operation. 3D virtual surgical planning may aid in determining the best plan and transferring it to reality. Particularly, surgery planning in a 3D view may be more accurate, realistic, and/or satisfying (to a surgeon as well as patient) as compared to a conventional process of 2D view-based planning. 3D planning, however, requires rendering of a 3D image from available data. The Inventors have recognized that X-ray images may be used for 3D reconstruction so that computational devices like mobiles phones or tablet computers, which have relatively lesser computational prowess, can also be used for the reconstruction process. Portability provided by such devices allows for greater flexibility in a healthcare environment. Hard copies of X-ray images of the region of the patient's body for operation, however, may not allow a surgeon to simulate post-operative conditions and/or may be an inconvenient way to perform measurements. Moreover, digital X-rays only provide 2D visualization of internal bone/joint anatomy and hence do not give accurate view, orientations, simulations, and/or feeling of surgery of a 3D environment.

A 3D surgical planning environment with 3D bone shapes may require a 3D virtual model of the bone. While such 3D models may be derived from CT scans of the bone anatomy of a patient, CT scans involve health risk, cost, and time, such that medical professionals may not prefer to perform surgery planning using CT scans. Moreover, 3D model reconstructions from CT scans are difficult on portable mobile devices, due to data size and computational requirements. Conversion of CT data to a 3D model is anyway time-consuming and requires significant manual inputs. Transferring CT scan data over the internet/network for various applications like tele-radiology, collaborative diagnosis, sharing, and saving a diagnosis or surgery planning, cloud-based medical applications based on 3D visualization of patients' anatomy may further be burdensome.

The Inventors have newly recognized that conversion of 2D X-ray images into 3D models may solve the above and other problems. Converting 2D X-ray images into 3D models may be computationally heavy and/or require X-ray images to be input in a way requiring a radiologist or surgeon to take extra care and/or use a special imaging device or a calibration device. In addition to the advantages of 3D surgical planning, 3D images/models of the bone can also be used for printing the bones into plastic models for informing patients about the surgery and/or training and real-model-based surgery planning. 3D models of bones can also be used for printing patient-specific instrumentation used in orthopedic surgeries. Use of 2D X-rays for 3D modelling does not require a patient to go under the health risk or expense of CT scanning. 2D imaging data is further much smaller and much more easily transferred than CT scan data for transfer to an instrumentation manufacturer. Thus, to overcome these newly-recognized problems as well as others and achieve these advantages, the inventors have developed example embodiments and methods described below to address these and other problems recognized by the Inventors with unique solutions enabled by example embodiments.

The present invention is devices, software as stored or executed on tangible computer-readable media, and methods for converting 2D X-rays into full 3D pre-operation planning models. In contrast to the present invention, the few example embodiments and example methods discussed below illustrate just a subset of the variety of different configurations that can be used as and/or in connection with the present invention.

FIG. 1 is an illustration of a block diagram of an example embodiment system 1 useable to obtaining 3D images using conventional 2D X-ray images. For example, 3D models of bones may be generated from one or two 2D X-ray image/radiographs. Example embodiment system 1 is processor-based, and actions of system 1—and where example embodiment system 1 executes example methods—are dependent upon the processor(s) being specially-configured for the same. As shown in FIG. 1, an X-ray inputter 12 provides X-ray images for conversion. Inputter 12 may acquire the X-ray images through known procedures with conventional single-view X-ray imaging equipment. Orthogonal X-ray images from biplanar imaging may also be used. Such X-ray images from inputter 12 may include medial-lateral and anterior-posterior views. The X-ray images may not have any markers and/or have any known orientation with respect to the bone.

Alternatively, or additionally, a data importer 14 may import a patient's X-ray image(s) in digital format. For example, importer 14 may be a scanner configured to convert X-rays in hard copy format to a digitized format.

This digitization may be done simply by using a camera, an X-ray digitizer, and/or an X-ray film scanner that converts the X-rays into digital format, such as any of the formats selected from JPG/TIF/PNG or DICOM format and the like. The X-ray images imported can belong to medial-lateral (ML) view or anterior-posterior (AP) view or both. Such imported images, may be processed for 3D reconstruction as final X-ray images in a digital format.

Figure 2:
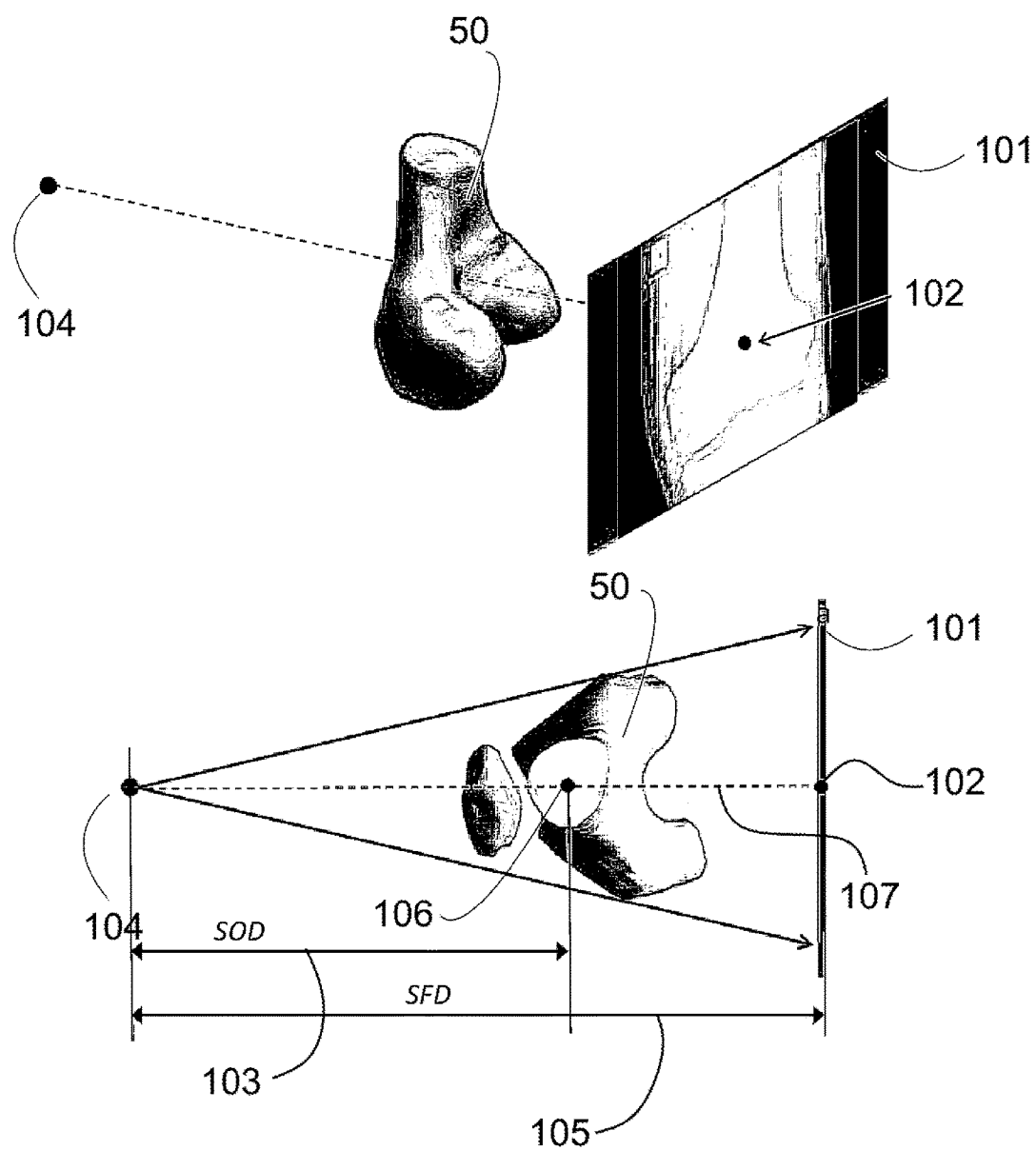
FIG. 2 is an illustration of a camera model source positioning.

For 2D-to-3D conversion, a camera model determinator 18b may detect whether an X-ray image is ML or AP, using known parameters. As shown in FIG. 2, image plane 101 is a plane in a 3D imaging space that corresponds to detector plane 101, a plane coinciding with the flat X-ray sensor panel or a film of the real imaging environment, where the projection of the body/object/bone is formed. Image center 102 is the central position of a rectangular detector. For example, image center 102 may be the normal position on image plane 101, which coincides with the X-ray source, such as an X-ray sensor panel or a film is as placed during the imaging.

The determined camera model is used for 3D reconstruction to mimic the real X-ray imaging environment and includes the following: position of X-ray source 104, such as a point source corresponding to real X-ray source of the imaging equipment, with respect to image plane 101 in the imaging space; and the distance 103 between centroid 106 of an object such as bone 50 and the X-ray source 104, measured in the direction normal 107 to image plane 101 in the imaging space.

As shown in FIG. 2, for the camera model a position of source 104 with respect to image center 102, source film distance (SFD) 105, source object distance (SOD) 103 is defined. Position of the X-ray source 104 with respect to image center 102 is determined so that a normal of image plane 101 arising from image center 102 will coincide with source 104 at a known distance called source film distance 105 from image center 102. Typically, SFD 105 is equal to the distance between an X-ray source 104 and the detector, measured along the direction that is normal 107 to detector plane 101.

Source object distance 103 may be defined as the distance between X-ray source 104 and bone-centroid 106, which is the average position of all the surface points of bone 50, measured along direction normal 107 to image plane 101. A camera calibration perspective ratio K may be defined as a ratio of SOD 103 to SFD 105. SOD 103 may either be a known parameter or may be approximated. An example method to determine SOD 103 approximately is disclosed as below.

A spherical ball marker with a known actual diameter (for example, 25 mm) is placed near the object (bone 50/body) during X-ray imaging, closer to image center 102, at a height from detector plane 101, that is closer to the height of centroid 106 from detector plane 101, by eyeballing. SOD 103 will be equal to multiplication of SFD 105 and the ratio of the known actual diameter of the spherical ball marker to the diameter of the circular/elliptical projection of the spherical ball marker on detector plane 101. The diameter of the circular/elliptical projection of the spherical ball marker on detector plane 101 is equal to the diameter of the circular/elliptical projection of the spherical ball marker measured on the final X-ray image multiplied by the digital magnification ratio (given below).

A digital magnification ratio determinator for an X-ray image (ML or AP) may be included in example embodiments. The digital magnification ratio is the ratio of the value of the distance between the positions of the projections of any two points on the object's surface on detector plane 101 to the value of the distance between the corresponding points as measured in the final X-ray image, which may be measured in terms of pixels or mm. This ratio can be a known parameter, or an example method for determining the digital magnification ratio for an X-ray image may be used wherein a circular coin marker with known actual diameter is placed on the detector while taking the X-ray image. The digital magnification ratio will be approximately equal to the ratio of the known actual diameter of the circular coin to diameter of the coin as visible on the final X-ray image, as measured in terms of number of pixels or mm. All the positions determined on the final X-ray image, in terms of X and Y coordinates (e.g., in pixels) may be multiplied with the digital magnification ratio before processing for 3D reconstruction. This includes contour points and landmarks.

As shown in FIG. 1, example embodiment system 1 may include a contourer 16 that defines contours of a bone or other object in an uploaded or imported X-ray. The contour of bone is a curve consisting of set of 2D points on the final X-ray image which corresponds to the outer boundary of the bone that is visible on the final X-ray image. Contourer 16 may allow a user to draw an outer boundary of the bone anatomy of interest. Typically, a user draws the outer boundary of the bone anatomy of interest, depending on the surgery. For example, a femur and tibia bone for knee replacement or tibial osteotomy surgery may be outlined. Automated pre-defined contouring may be used to pre-empt contouring lines and assist the user in relatively more precise contouring. Brightness and/or contrast of the X-ray image may be adjusted so that the boundary of bone anatomy is easily distinguishable.

Contourer 16 may provide an initial contour for each bone that can be boundary of the projection of the template according to the calculated camera model. Since the vertices of the template will be divided and labelled as distinct regions, the projected initial contour will also have the distinction of the predetermined regions. A user may modify the initial contour to fit the bone's outer edge or boundary more precisely; the modification entails scaling, translation, rotation, deformation, etc. Contourer 16 may provide a touch interface wherein a user can touch a bone's boundary on the X-ray image and the contouring mechanism converts the touch interfaces to points, lines, and provides a continuous pattern in an intelligent manner. Defining contours using the contourer 16 is provided to define co-ordinates of the contour of the bone with respect to a relative or pre-defined center of an X-ray image. Typically, the X-ray in the medial-lateral plane is the x-z plane for the purposes of this invention. Typically, the X-ray in the anterior-posterior plane is the y-z plane for the purposes of this invention.

Anatomical regions may give anatomical landmarks to define anatomical parameters. Anatomical landmarks may be used for alignment of templates, and anatomical parameters may be used for selective anatomical modification of pre-created 3D templates. A 2D Anatomical Value may include: anatomical landmarks—2D positions of unique anatomical features identified on the final X-ray image on the basis anatomical regions; and anatomical parameters—values of geometric parameters like lengths and angles calculated based on anatomical landmarks to be used for 3D reconstruction. The points of the contour of bone may be divided into subsets in such a way that the subset points correspond to distinct anatomical regions of the bone. For a femur and tibia, FIG. 3A shows the anatomical regions.

Figure 3A:
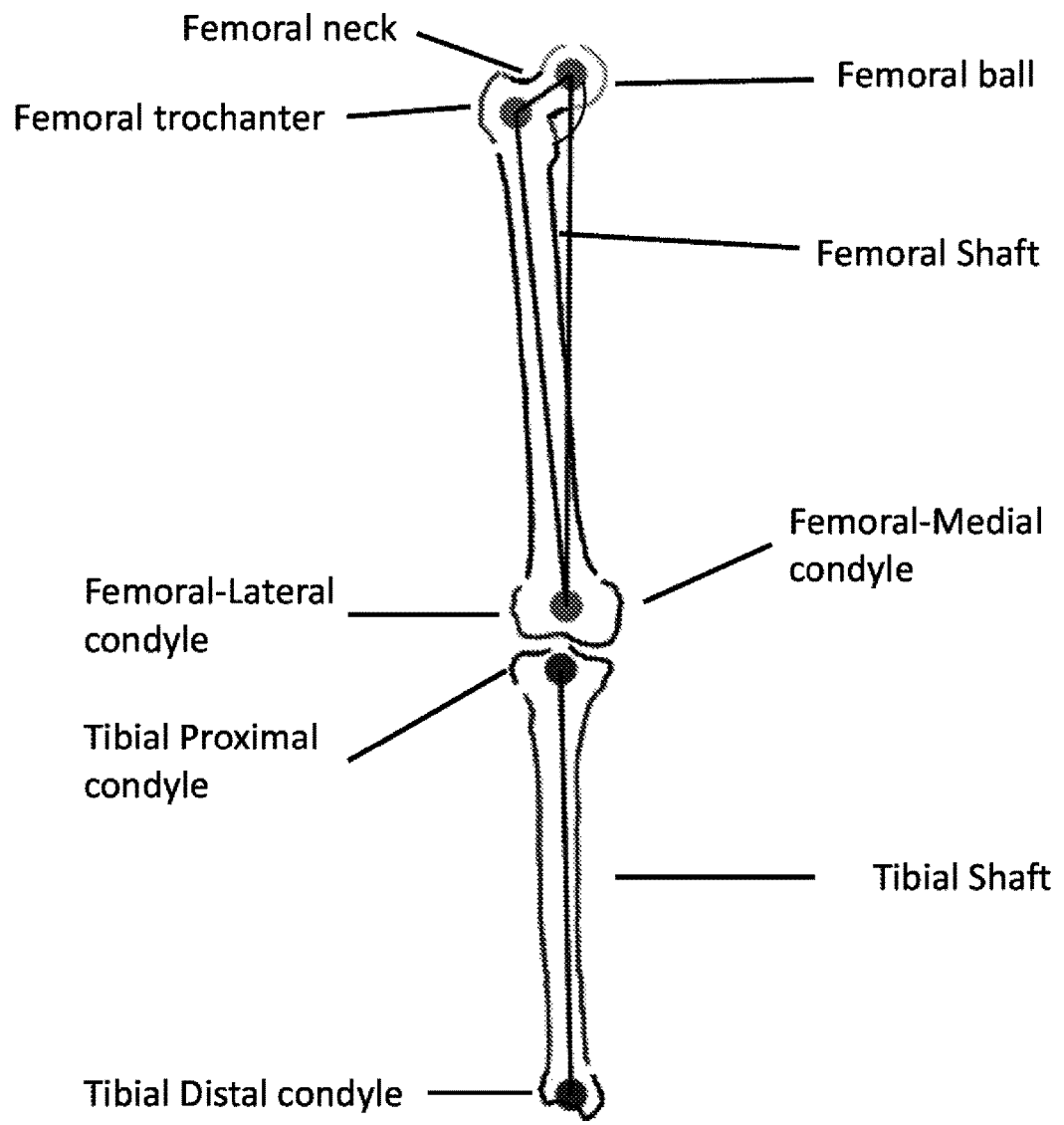
FIG. 3A is an illustration of anatomical regions for femur and tibia.

For a femur bone, such as that shown in FIG. 3A, a contour of the bone in at least one view (ML or AP) of an X-ray image, the anatomical regions will be: femoral lateral condyle; femoral medial condyle; femoral shaft; femoral neck; femoral trochanter; and femoral ball. For a tibia bone such as that shown in FIG. 3A, a contour of the bone in at least one view (ML or AP) of X-ray image, the anatomical regions will be tibial proximal condyle, tibial shaft, and tibial distal condyle. The anatomical regions may be distinguished by drawing different regions of the contour in different colors if the contour is determined by drawing manually.

Based on the anatomical regions, axes are also determined manually or automatically. For a femur, the anatomical axis, shaft axis, and the neck axis may be determined. For a tibia, the anatomical axis and shaft axis may be determined. In a manual method of determination of any axis, a line may be fitted along user specified points that lie on the axis in the image. In another method of determination of any axis, a user may place a given line or curve (in case of shaft axis) along the position and orientation of the required axis. In an automatic method, a geometric calculation is performed on the distinguished anatomical regions of the contour. For example, a best fit line to the femoral shaft region of the contour may be assigned as the femoral anatomical axis. Or, for example, a best fit Bezier curve to the femoral shaft region of the contour may be assigned as the femoral shaft axis. Or, for example, a best fit line to the femoral neck region of the contour may be assigned as the femoral neck axis. Or, for example, a best fit line to the tibial shaft region of the contour may be assigned as the tibial anatomical axis.

Figure 3B:
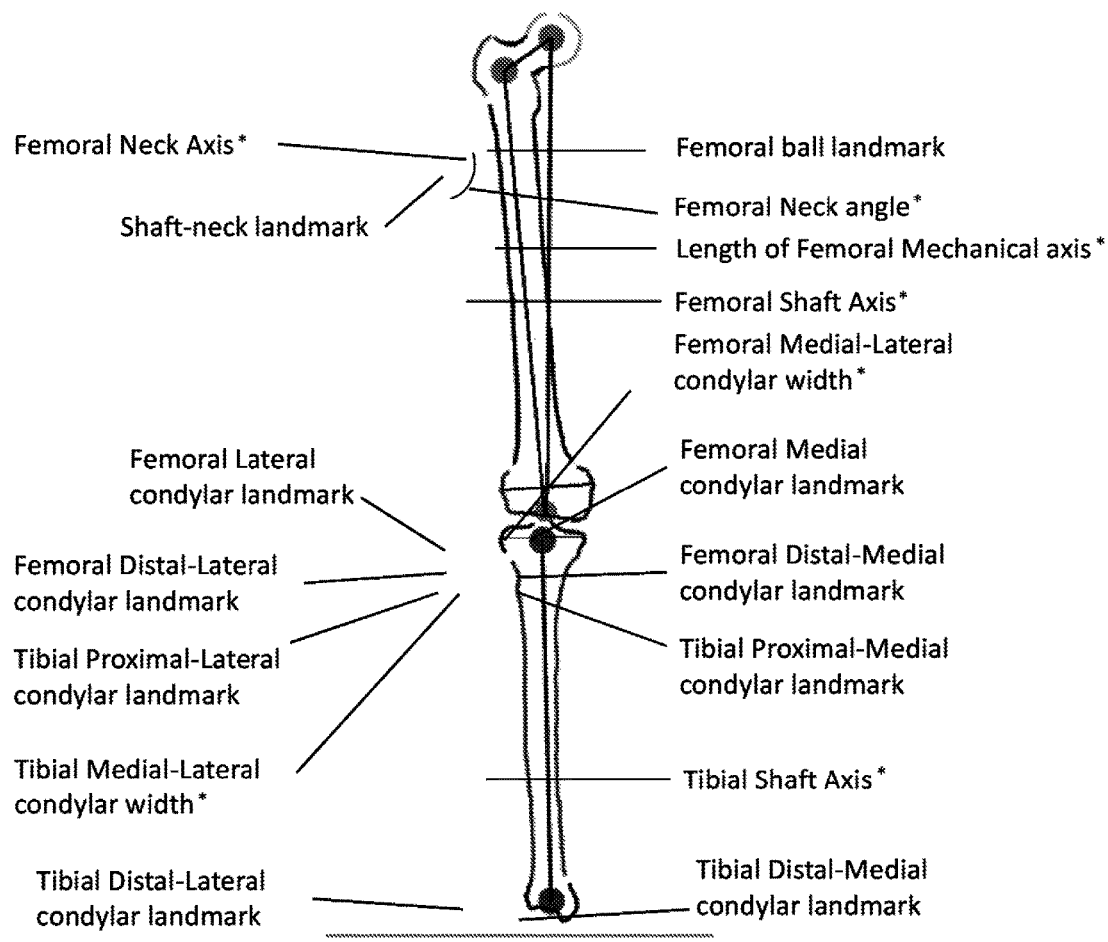
FIG. 3B is an illustration of anatomical landmarks and the anatomical parameters for femur and tibia.

Positions of anatomical landmarks may be determined on the final X-ray image with respect to the extracted contours, based on anatomical regions. For a femur and tibia, FIG. 3B shows the anatomical landmarks and the anatomical parameters. In a manual method of determination of anatomical landmarks, a user may specify points on the image that lie on the landmark. In an automatic method of determination of anatomical landmarks, the anatomical landmarks, as mentioned above, may be determined from the final X-ray image by calculating geometric features, such as extreme position in a direction, or a centroid, or a peak, of the above-mentioned anatomical regions of the contour maybe with respect to some known anatomical axes.

As shown in FIG. 3B, for a femur, the following landmarks were identified, on an AP view X-ray image: Femoral Distal-Lateral condylar landmark—a position of the extreme distal point along the Femoral anatomical axis of the Femoral lateral condyle region of the contour; Femoral Distal-Medial condylar landmark—a position of the extreme distal point along the Femoral anatomical axis, of the Femoral medial condyle region of the contour; Femoral Lateral condylar landmark—a position of the extreme lateral point along the line passing through the Femoral Distal-Lateral condylar landmark and the Femoral Distal-Medial condylar landmark; Femoral Medial condylar landmark—a position of the extreme medial point along the line passing through the Femoral Distal-Lateral condylar landmark and Femoral Distal-Medial condylar landmark; Femoral ball landmark—an average of the position of the center of the best fit sphere to all the points of the femoral ball region of the contour; Greater Trochanter tip landmark—a position of the extreme proximal point of the Femoral trochanter region of the contour; and Shaft-Neck landmark—a position of the intersection of the femoral anatomical axis and the AP femoral neck axis.

For a femur, the following landmarks were identified, on an ML view X-ray image: Femoral Distal-Lateral condylar landmark—a position of the extreme distal point along the Femoral anatomical axis, of the Femoral lateral condyle region of the contour; Femoral Distal-Medial condylar landmark—a position of the extreme distal point along the Femoral anatomical axis, of the Femoral medial condyle region of the contour; Femoral Posterior-Lateral condylar landmark—a position of the extreme posterior point perpendicular to the direction of femoral anatomical axis, of the Femoral lateral condyle region of the contour; Femoral Posterior-Medial condylar landmark—a position of the extreme posterior point perpendicular to the direction of femoral anatomical axis of the Femoral medial condyle region of the contour; Femoral Anterior-Lateral condylar landmark—a position of the extreme anterior point perpendicular to the direction of femoral anatomical axis of the Femoral lateral condyle region of the contour; Femoral Anterior-Medial condylar landmark—a position of the extreme anterior point perpendicular to the direction of femoral anatomical axis, of the Femoral medial condyle region of the contour; Femoral ball landmark—an average of the position of the center of the best fit sphere to all the points of the femoral ball region of the contour; and Greater Trochanter tip landmark—a position of the extreme proximal point of the Femoral trochanter region of the contour.

For a tibia, the following landmarks were identified, on an AP view X-ray image: Tibial Proximal-Lateral condylar landmark—a position of the Extreme lateral point perpendicular to the direction of tibial anatomical axis, of the tibial proximal condyle region of the contour; Tibial Proximal-Medial condylar landmark—a position of the Extreme medial point perpendicular to the direction of tibial anatomical axis, of the tibial proximal condyle region of the contour; Tibial Distal-Lateral condylar landmark—position of the Extreme lateral point perpendicular to the direction of tibial anatomical axis, of the tibial distal condyle region of the contour; and Tibial Distal-Medial condylar landmark—position of the Extreme medial point perpendicular to the direction of tibial anatomical axis, of the tibial distal condyle region of the contour.

For a tibia, the following landmarks were identified, on an ML view X-ray image: Tibial Proximal-Posterior condylar landmark—a position of the Extreme posterior point perpendicular to the direction of tibial anatomical axis, of the tibial proximal condyle region of the contour; Tibial Proximal-Anterior condylar landmark—a position of the Extreme anterior point perpendicular to the direction of tibial anatomical axis, of the tibial proximal condyle region of the contour; Tibial Distal-Posterior condylar landmark—a position of the Extreme posterior point perpendicular to the direction of tibial anatomical axis, of the tibial distal condyle region of the contour; and Tibial Distal-Anterior condylar landmark—a position of the Extreme anterior point perpendicular to the direction of tibial anatomical axis of the tibial distal condyle region of the contour.

Anatomical Parameters may be calculated automatically based on anatomical landmarks; parameters can be a distance between two landmarks, an angle between lines defined by any two landmarks, and/or any correlative value between landmarks. For a femur, on AP X-ray image, the following parameters were identified: Femoral Medial-Lateral condylar width—the distance between femoral Lateral condylar landmark and femoral Medial condylar landmark; Femoral Shaft length—the distance between femoral shaft-neck landmark and a position of intersection of femoral AP anatomical axis and a line connecting Femoral Distal-Lateral condylar landmark and Femoral Distal-Medial condylar landmark; Length of Femoral Mechanical axis—the distance between femoral ball landmark and the center of Femoral Distal-Lateral condylar landmark and Femoral Distal-Medial condylar landmark; Femoral Neck length—the distance between AP Femoral ball landmark and Shaft-Neck landmark; and Femoral Neck angle—the angle between AP femoral anatomical axis and AP femoral neck axis.

For a tibia, on AP X-ray image, the following parameters were identified: Tibial Medial-Lateral condylar width—the distance between tibial Proximal-Lateral condylar landmark and tibial Proximal-Medial condylar landmark; and Tibial Shaft length—the distance between a position of intersection of tibial AP anatomical axis and a line connecting tibial Proximal-Lateral condylar landmark and tibial Proximal-Medial condylar landmark and a position of intersection of tibial AP anatomical axis and a line connecting tibial Distal-Lateral condylar landmark and tibial Distal-Medial condylar landmark.

In example system 1 for converting 2D to 3D surgical data, bone template model inputter 18a may provide a corresponding bone template model in 3-dimensional format. The corresponding bone template model format may be a clinically normal bone in the form of 3D mesh with triangular elements. This bone template model may be reconfigured into a shape that matches the input contours as defined by contourer 16. The pre-created 3D template may be formed in the form of mesh, pre-created from a CT scan of some healthy/average subject or subject with matching medical condition to a patient whose input X-ray images are used for the 3D reconstruction. A data set with multiple subjects may be created. Demographics and gender of subjects may be used to make discreet the data set. Different template shapes belonging to different ages or age groups, ethnicity groups, etc. may be created and stored.

A 3D surface model can be created using techniques such as MIMICs through segmentation of all the slices images of CT scan. The surface model can be exported as point cloud surface model. A point cloud is a set of data points in some coordinate system. In a 3D coordinate system, these points are usually defined by X, Y, and Z coordinates and are often intended to represent the external surface of an object (such as bone 50). Connectivity between points of the point cloud can be formed using methods like constrained Delaunay Triangulation to form a 3D mesh model with triangular elements. A triangular element is an element which is defined by forming connectivity between three points. By triangulation of all the points of the point cloud a mesh of triangular element may be formed. The point cloud may be sampled to reduce the number of surface points, and hence the number of triangular elements resulting from meshing. Depending on extent of sampling, or point cloud density, sampling related parameters, such as reduction in volume formed by the closed mesh, may be defined to form an optimum model such that errors are minimum and bone shape features are preserved, but points are relatively reduced.

A surface model may be exported from a dense cloud—for example, a cloud with 1 mm point-to-point mech distance. The surface model may then be uniformly sampled to a sufficient number of points. A sufficient number of points may be determined by measuring the level of detail of the 3D bone model. The level of detail and the volume (of the closed meshed model) gets reduced after the sampling. The reduction in level of detail can be determined by measuring the difference in volume of a closed mesh created from the initial dense point cloud and that of a closed mesh created from the sampled points. By putting the threshold on the level of detail, such as a volume reduction of 2%, the sampling and sufficient number of points may be determined. The point-to-point distance at this condition, in an example of a femur bone template, may be 3 mm. A 3D mesh with triangular elements may be created from the sampled points and used as the template model for the 3D reconstruction. The template model may be in the form of triangular surface mesh with sets of a number of vertices and a number of faces. For a truncated distal femur bone template, the number of vertices may be 1795 and the number of faces may be 3559, for example. These example numbers of points are sufficient to define the distal femur part of the bone with its shape features.

Figure 3C:
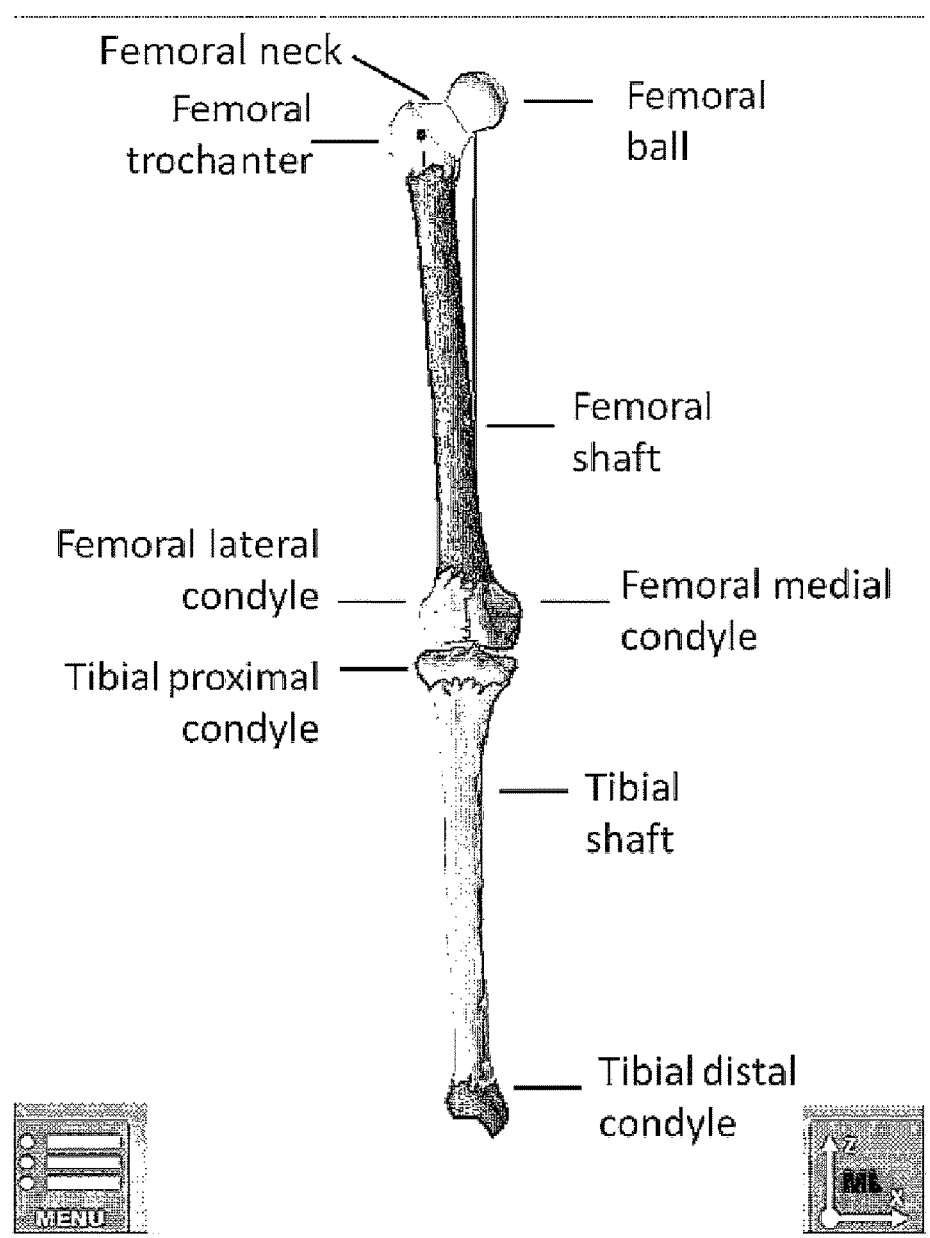
FIG. 3C is an illustration of anatomical regions corresponding to the regions distinguished in the contour of the X-ray image.
Figure 3D:
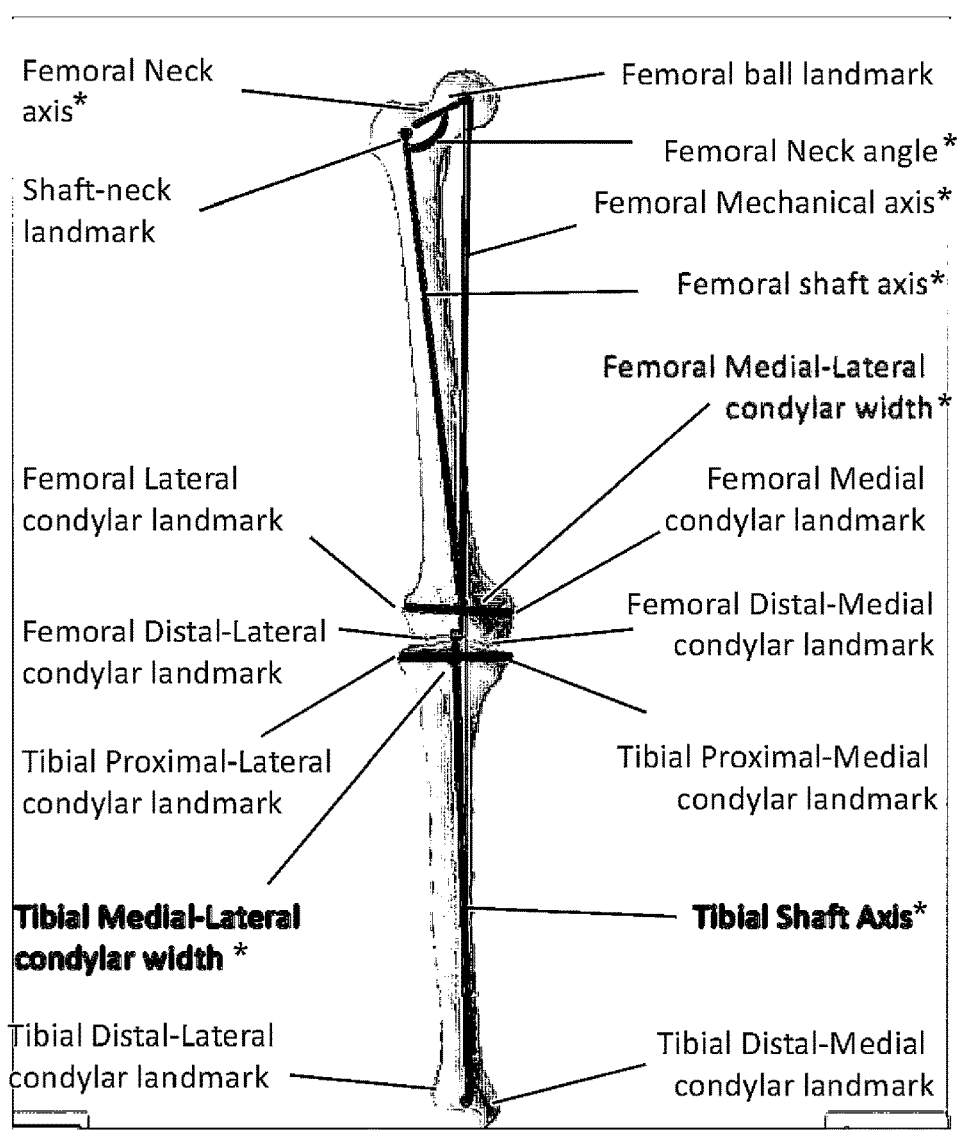
FIG. 3D is an illustration of anatomical landmarks identified based on anatomical regions.

The anatomical regions, axes, anatomical landmarks, and anatomical parameters of the 3D template model may be pre-determined, at least manually. FIG. 3C illustrates these anatomical regions as corresponding to the regions distinguished in the contour of an X-ray image. Anatomical landmarks identified based on anatomical regions of the template may be the same as the anatomical landmarks identified based on anatomical regions of the contour, as shown in FIG. 3D. Anatomical parameters identified based on anatomical landmarks of the template may be the same as the anatomical parameters identified based on anatomical landmarks of the contour.

In example embodiment system 1, a 2D-to-3D converter 18 converts the 2D X-ray images to 3D images. The conversion may be based on Laplacian deformation, which is an efficient shape deformation technique. The generated 3-dimensional model may a surface model and/or a solid model, with the surface model having reduced computational requirements. A silhouette vertices extractor 18d in converter 19 may extract silhouette vertices and projections of a 3-dimensional template, at its aligned position, in accordance with the determined camera model, using known parameters. Silhouette vertices are those vertices of the template which form the outer contour of the template's projection on image plane 101, according to camera model, hereinafter called a template projection contour.

Figure 4:
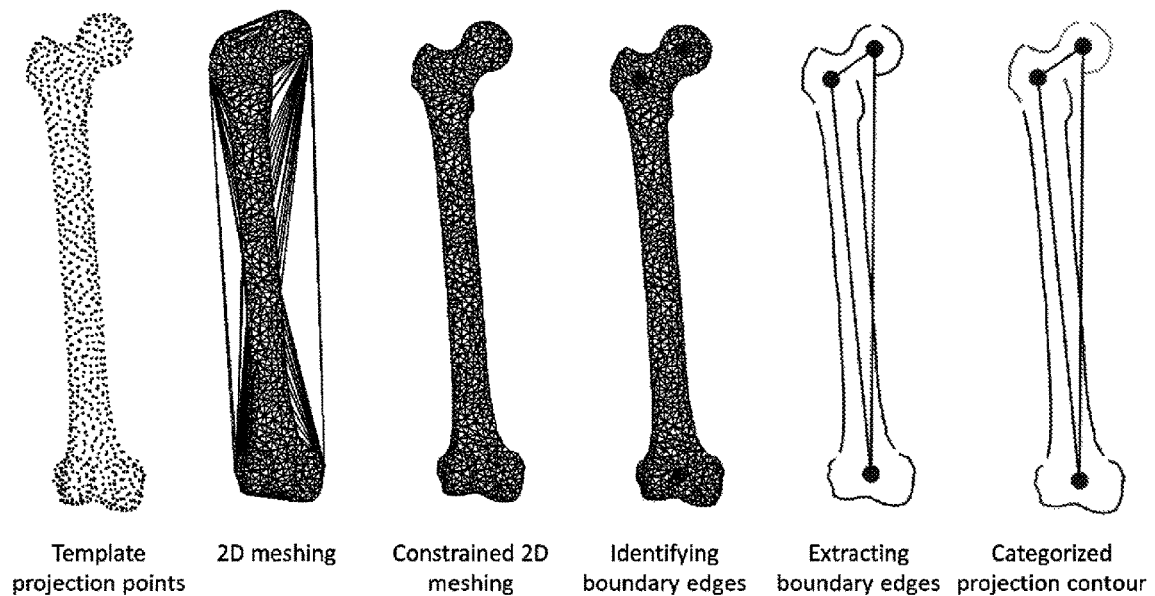
FIG. 4 is an illustration of triangulation of projected points, meshing after putting constraints and the outer contour calculation.

For a camera model, a perspective projection of the vertices of the template mesh may be computed on its image plane. The outer contour of the template projection, or template projection contour, can be computed using the following example method. All vertices of the template may be projected on image plane 101 (perspective projection). Triangulation meshing of projection is obtained by using Delaunay triangulation method (2DM). Using constraint Delaunay triangulation method, a 2D mesh (2CDM) with triangular elements is created from the projected points as seen in FIG. 4, illustrating triangulation of projected points, meshing after putting constraints and the outer contour calculation. Those edges of the triangular elements which are shared with only one triangular element are the boundary edges and the corresponding projected points are the boundary point and hence the template projection contour points. The silhouette vertices are those vertices of the template which form the outer contour of the template's projection (template projection contour) on image plane 101, according to a camera model.

An example embodiment 2D-to-3D converter 18 may include an aligner 18c that aligns a pre-created 3-dimensional template of a bone with respect to the contour points. The pre-created 3-dimensional template may be formed in a mesh, pre-created from a CT scan of some clinically normal bone, such as from a data set with multiple subjects. Alignment of the pre-created 3-dimensional template differs according to the image view and bone anatomy. For example, the image view may be one from medial-lateral or one from anterior-posterior.

Alignment may be performed in the context of a femur bone, for example. Converter 18 may include anterior-posterior pose estimator 22 configured to determine a first alignment of a femoral template with respect to the anterior-posterior input X-ray image. Input to estimator 22 may be taken from the contourer 16, which has contoured data and image of a bone's X-ray in its anterior-posterior view. A joint center may be located, and the template projected on to an image plane with arbitrary initial positions and orientation. This assists in deformation of the femoral template for 3D reconstruction. The template models (femur and patella), obtained from the bone template model inputter 12 may be in the form of surface point cloud.

A source-film distance 105 is calculated, and a source-object distance 103 is calculated. The projection may be determined as perspective type and calculated according to a camera model. Then an automatic initialization may place the contour points on image plane 101 of the camera model. The template may be positioned and/or translated between X-ray source 104 and image plane 101 of the camera model, in such a way that the template's centroid 106 is at the distance of SOD 103 from the X-ray source 104, measured along a normal 107 to image plane 101. Centroid 106 may be defined as the average of the positions (x,y,z) of the vertices of the template. Orientation of the template may make image plane 101 parallel to that plane of the template (ML or AP) of which the contour belongs to. The template may be rotated about the normal to image plane 101 passing through the template's centroid 106, in such a way that the projection of its anatomical axis (by the camera model) becomes parallel with the anatomical axis of the contour. The templates may be translated along directions parallel to image plane 101 in such a way that centroid 106 of the bone template projection coincides with that of the contour.

Figure 9:
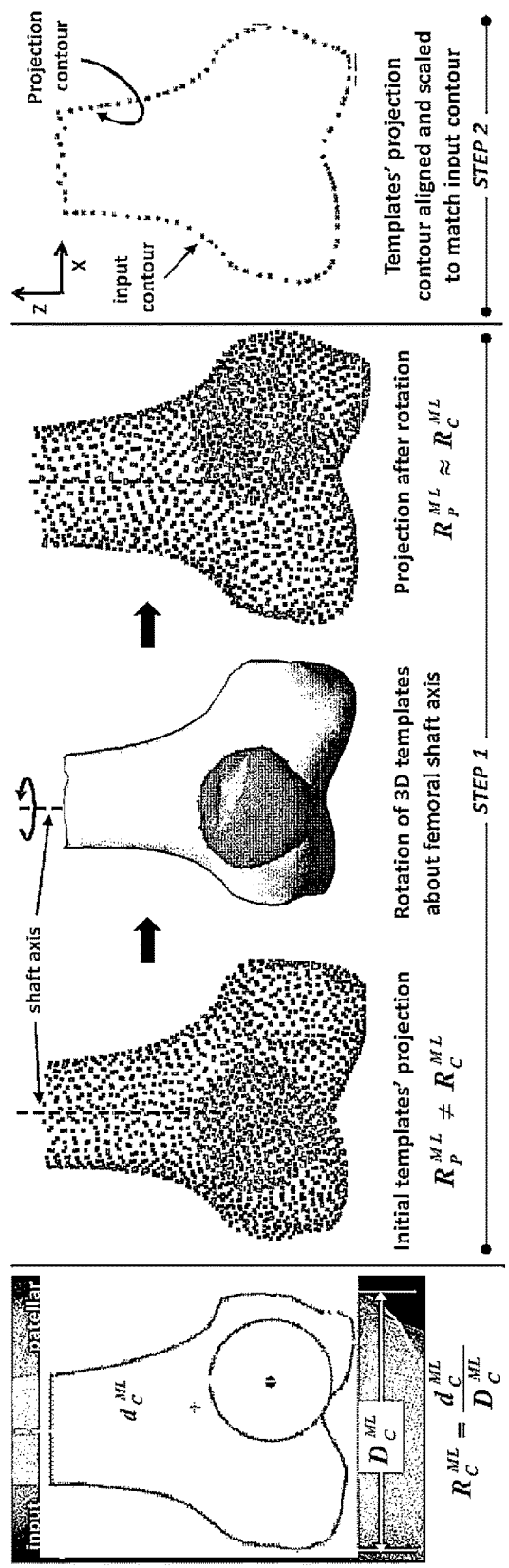
FIG. 9 is an illustration of extraction of separate boundary contours for bone shaft, from an ML view x-ray image.

As shown in FIG. 9, after automatic initialization, a two-step procedure may be applied to find the template's pose in 3D. A patellar template may be rigidly translated or rotated with the femoral template. In "Step 1," the templates (femur and patella) are rotated about an anatomical axis, e.g., parallel to Z-axis, to match the position of the joint center with respect to the template in its projection on image plane 101 with that in the input contour. The horizontal distance, measured along a direction perpendicular to anatomical axis and a normal to image plane, "dcml" between the joint center and the anatomical axis is calculated from the input contour. The ratio "rcml" of distance "dcml" to medial-lateral width "dcml"—distance between femoral Lateral condylar peak and femoral Medial condylar peak—of the femur bone is also calculated from the input contour. Similarly, distance "dpml" and ratio "rpml" are calculated from the femoral template projection. Finally, the templates are rotated about the anatomical axis such that the ratio "rpml" matches the ratio "rcml."

If the distance "dcml" is constant, an angle of rotation about the anatomical axis can be calculated using the relation between the distance "dcml" and patellar angle as shown in FIG. 9. After rotation about the anatomical axis, distance, and hence ratio, changes. Hence, the process is applied iteratively until the difference rpml-rcml becomes very small.

To locate a joint center, on the contour (ML view), the joint center is the position of the centroid of the points of the contour of patella bone visible on the X-ray image. On the template projection, the joint center is the position of the centroid of the points of projection of the template of Patella bone, which is always rigidly positioned with respect to the femur bone template. In case the femur bone is truncated, after step 1, the input contour and the template projection are first processed for the equivalence in shapes. The input contour of the bone was truncated to match its aspect ratio to that of the projection. Also, the outer boundary of the femoral template projection (projection contour) is extracted automatically using the silhouette vertices' extraction.

As shown in FIG. 9, in Step 2, the extracted femoral template projection contour is aligned to the input contour using a shape registration method like iterative closet point analysis (ICP). Optimal values transformations (translation, scaling, and rotation) are calculated using ICP, for the template projection contour to align it with the input contour. Corresponding transformations (translation, scaling, and rotation) are applied to the template in such a way that its projection on image plane 101 (after applying transformations) will match with the aligned template projection contour.

Figure 5:
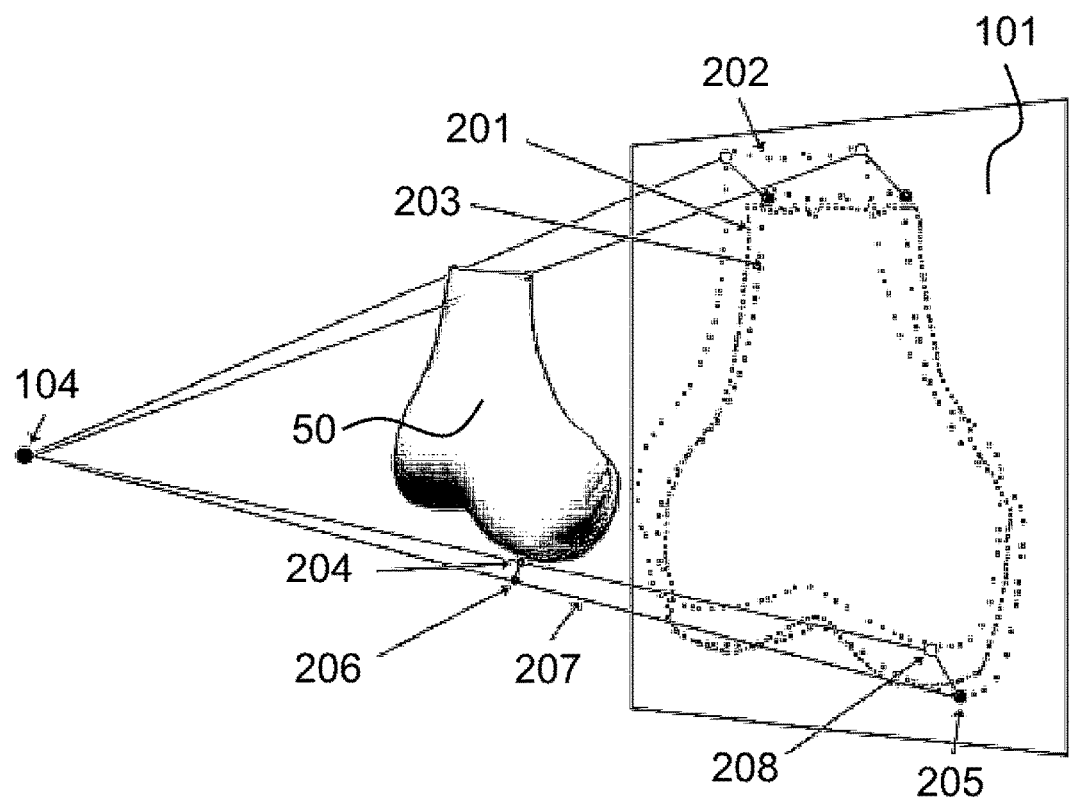
FIG. 5 is an illustration of femur and tibia images wherein with corresponding transformations to the template.
Figure 6:
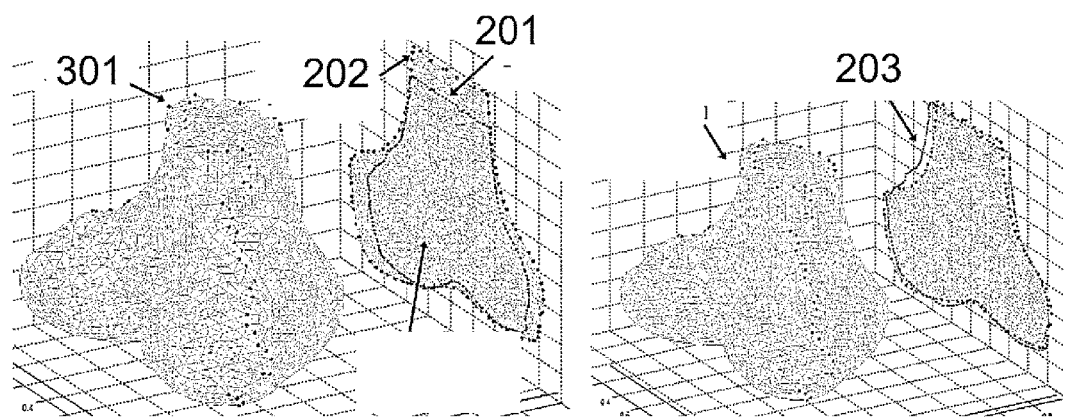
FIG. 6 is an illustration of the template model before and after the alignment.

As shown in FIG. 5, to apply corresponding transformations to the template, 3D-3D point pairs are determined after the final alignment of template projection with the contour points of anterior-posterior view. This may be performed using a back projection method. Input contour 201 is provided by a user using an X-ray image. Further, template projection contour 202 that is input using the system and method of this invention, which template projection contour is provided before alignment. Aligned template projection contour 203 may be provided after alignment of the template projection with respect to the input contour defined by the user. For each number of silhouette vertices, a silhouette vertex of the template with its initial position $as_m$ 204 corresponding to the template projection contour point $pp_mb$ 205, a closest position $bs_m$ 206 on the projection ray $r_m$ 207 joining the X-ray point source 104 and the corresponding aligned template projection point $pp_m$ 208 is calculated using a template projection point $pp_mb$ 205 available before alignment. In this way, total M numbers of 3D-3D point pairs ($as_m$, $bs_m$) are found for each silhouette vertex. ICP technique was applied on these point pairs ($as_m$ 204, $bs_m$ 206) to find the transformations of silhouette vertices 301 for their optimal superimposition and applied to the whole template model. FIG. 6 shows the template model before and after the alignment.

In the iterative process of the ICP method, after each step of the iteration, a new corresponding points' pair between template projection and input contour may be determined. After each step of the iteration, the mean absolute distance (MAD) between the points of template projection contour and their corresponding closest points of the input contour may be measured. The iteration is stopped when the difference in MAD of the two consecutive steps of iterations is below 0.0001 mm. The MAD between the input contour and the template projection contour is minimized through the iteration. The corresponding alignment of the 3D template is then applied at once.

Example embodiment system 1 may include a medial-lateral pose estimator 24 configured to determine a second alignment of the template with respect to the input X-ray image, for a femur bone shape. Input to estimator 24 may be taken from contourer 16 which has contoured data and image of a bone's X-ray in its anterior-posterior view. An anterior-posterior projector projects the anterior-posterior image on to an image plane with arbitrary initial positions and orientation. This assists in formation of template models. The template model of femur, obtained from the bone template model input mechanism, is in the form of surface point cloud.

Figure 10:
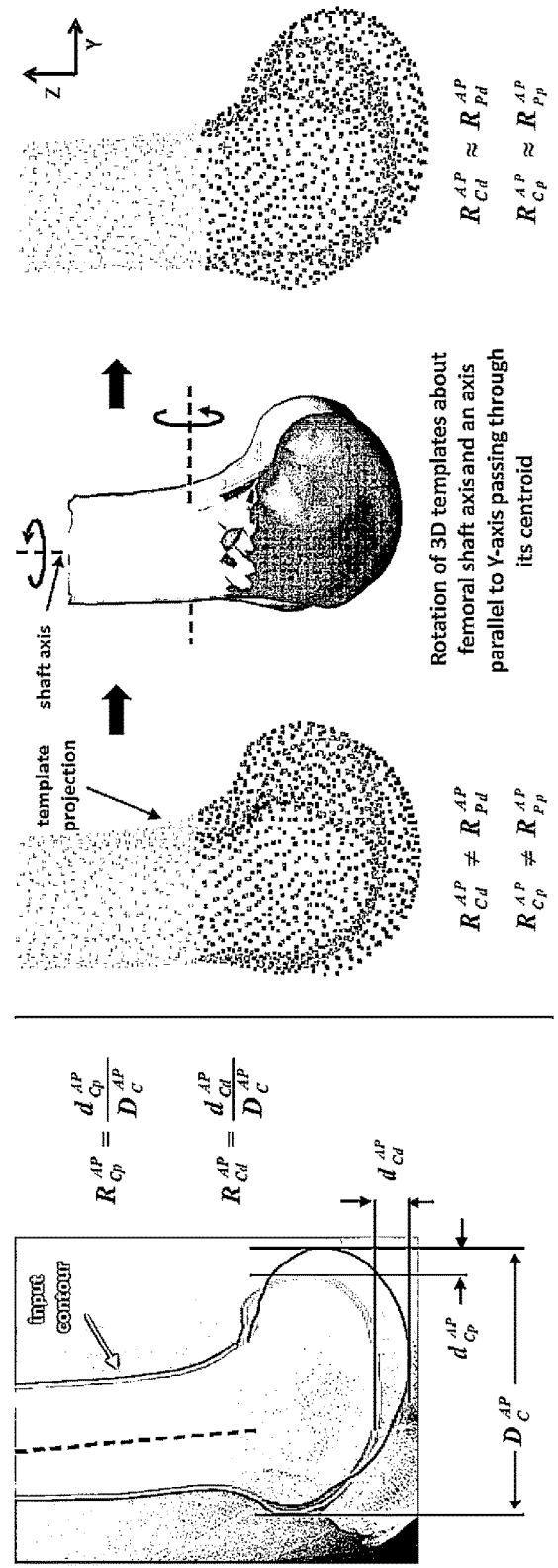
FIG. 10 is an illustration of template alignment with respect to Medial-Lateral image.

As shown in FIGS. 9 and 10, from the ML view X-ray image, separate boundary contours may be manually extracted for bone shaft, medial bone side, and lateral bone side. FIG. 9 illustrates template alignment with respect to Anterior-Posterior image and FIG. 10 illustrates template alignment with respect to Medial-Lateral image. The automatic initialization process may be similar as that for the anterior-posterior view. After the initialization, the two-step procedure is applied.

The template is first rotated about the shaft axis. For this, a ratio "rcapd" of distance between Posterior-Lateral condylar peak and Posterior-Medial condylar peak of the bone to the anterior-posterior width, both measured along direction perpendicular to anatomical axis and a normal to image plane, may be calculated from the contour in FIG. 10. Similar ratio "rpapd" may be calculated from the template projection on image plane. The template is rotated about the anatomical axis so that the ratio "rpapd" matches with the ratio "rcapd." The angle of rotation may be calculated using a trigonometric function.

The template is then rotated about an axis that is direction perpendicular to anatomical axis and a normal to image plane and passing through its centroid. To calculate the angle of rotation, a ratio "rcapp" of distance between Femoral Distal-Medial condylar landmark and Femoral Distal-Lateral condylar landmark (measured along the anatomical axis) to the anterior-posterior width (measured along a direction perpendicular to anatomical axis), may be calculated from the contour. Similarly, ratio "rpapp" may be calculated from the template projection on image plane (Y-Z plane). The angle of rotation is calculated such that the ratio "rpapp" matches with the ratio "rcapp." After step 1, step 2 is applied to find optimum translation, rotation, and scaling using a shape registration method like ICP, in the same way as it is applied for the anterior-posterior view. If the two images are exactly orthogonal to each other from bi-planar X-ray imaging, refer to FIG. 14.

Instead of separately finding a pose of the template with respect to AP and ML images/contours (as explained above), the template may be aligned in 3D space to match its projection contours, i.e., the template projection contours, with respect to both AP and ML contours simultaneously, using a shape registration method like ICP. Optimal values transformations (translation, scaling, and rotation) may be calculated using ICP, for the template to align it with both the input contours (ML and AP). The camera model with respect to the ML and AP view X-ray image are combined. In the combined camera model, the ML and AP view image planes and image centers have known fixed relative position and known fixed relative orientation (usually 90 degree) with respect to each other. Using this determined relative position and orientation the two camera models (for ML and AP view) are combined in one imaging space and include, two X-ray point sources, two image planes orthogonal to each other, and known SFD (source-film distance). A position of template is found in the imaging space in such a way the template projection contours on both image planes (calculated according to corresponding camera models) aligned with the shape of the corresponding contours. For this, the template is rotated and translated in the imaging space and the optimal rotation and translation parameters are found using modified ICP based method.

Example embodiment system 1 may include a selective anatomical modifier 26 for global matching configured to selectively modify anatomical regions by scaling, translation and/or rotation to match the 2D projections of its anatomical landmarks, axes, and parameters with the 2D anatomical parameters extracted from the final X-ray image (at least one). This may be done with respect to the ML and AP image for a truncated distal femur or proximal tibia. For example, the corresponding template may be uniformly scaled along all three directions (X, Y, and Z) to match the medial-lateral width of distal femoral condyle or proximal tibial condyle approximately. For a full femur, additional steps may be performed to match the shaft length, shaft axis and neck axis. The template's shaft part region may be scaled along the anatomical axis to match the length of 2D projection of the anatomical axis with the corresponding length in the input X-ray image. The femoral shaft region may be divided into sub-regions along the shaft-axis. The femoral shaft region may be sheared where sub-regions may be translated, bent where sub-regions may be rotated, and/or twisted where sub-regions may be rotated along shaft axis in such a way that the 2D projection of its shaft axis matches with the shaft axis in the input X-ray image. The femoral trochanter, neck, and ball regions (and maybe their sub-regions) may be sheared, scaled, bent, twisted, translated, and rotated along its neck axis to match the positions of the Femoral ball landmark, the Femoral greater trochanter tip landmark in the input X-ray image with the 2D projections of the corresponding landmarks of the template. Similarly, for the full tibia, the shaft length may be matched by scaling the template's shaft part along its anatomical axis to match the length of 2D projection of the anatomical axis with the corresponding length in the input X-ray image. All these operations may be performed while preserving connectivity between parts (neck, ball, shaft etc.).

2D values of the anatomical parameters of extracted from both AP and ML images may then be combined according to the determined camera model to get their 3D values with a 3D geometric calculation mechanism (standard 3D geometry method). The template is then selectively modified where regions or sub-regions may undergo transformations like scaling, shearing, translation, and rotation to match the 3D value of its landmarks, axes and anatomical parameters with the 3D values of the anatomical parameters calculated from the 2D values extracted from the AP and ML images.

Figure 8:
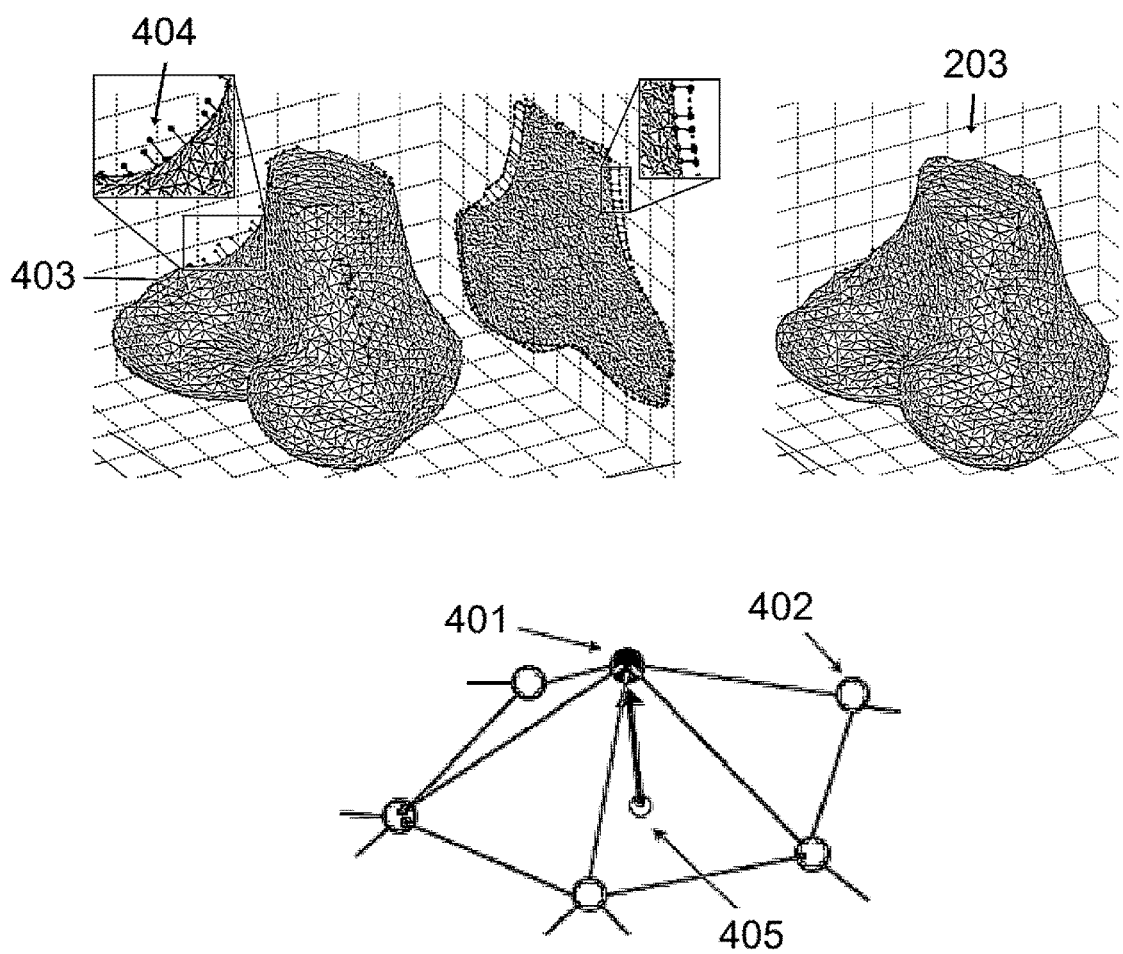
FIG. 8 is an illustration of deformation for local matching.

Example embodiment system 1 may include a template deformer 18e configured to deform a standard template model in accordance with defined contours and silhouette vertices obtained from the bi-planar X-ray images. Deformation may include deforming the transformed template mesh in such a way that the silhouette vertices get their target position (which will be determined using a SOM technique explained below) while preserving the overall topology and differential property of the transformed template. FIG. 8 illustrates deformation using Laplacian surface deformation (LSD). Each vertex of a mesh 401 is represented as a differential coordinate, which is the difference between the position of vertex and that of its neighbor vertices 402. In general, the inputs are the initial mesh, a set of anchor points (a few vertices of the initial mesh) and target positions of the anchor points. The output is a deformed mesh where the anchor points take the target positions while preserving the local shape features and topology of the initial mesh. For the template deformation, the template mesh model may be input as the initial mesh, the silhouette vertices with initial positions 403 are the anchor points, and the target positions 404 of the silhouette vertices are the target positions of the anchor points. The differential coordinate 405 for each vertex 401 is defined as the vector from the coordinates of the centroid of its immediate neighbors to its coordinates.

Figure 7:
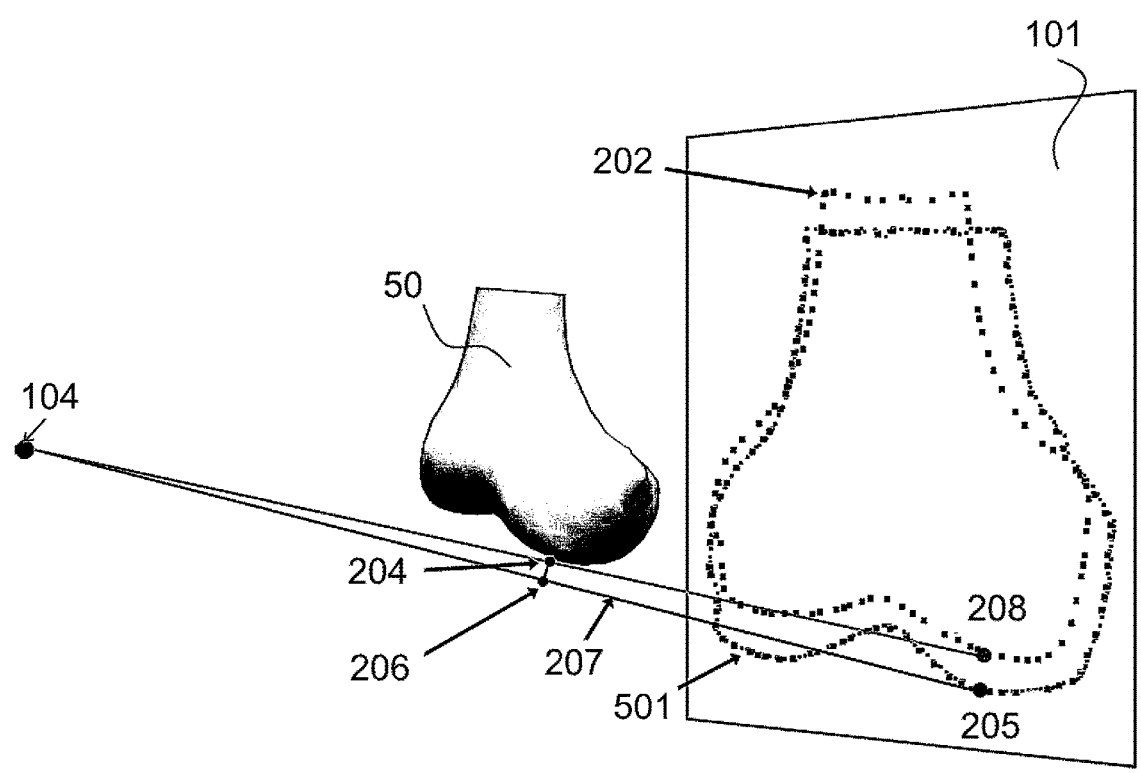
FIG. 7 is an illustration of template deformation.

The template deformation may be performed using a Laplacian Surface Deformation (LSD) based method. As seen in FIG. 7, the template projection contour points may be adapted to the input contour using a self-organizing maps (SOM) technique. The top contour is template projection contour 202. Black contour is the input contour. The lower contour is the adapted template projection contour 501 obtained by deforming template projection contour 202 using a SOM technique. This is how to find 2D-2D correspondence. By back projecting the points of these adapted template projection contour, desired positions of the silhouette vertices are obtained and hence the 3D-3D correspondence is obtained. This 3D-3D correspondence may then be used to deform the 3D template using a Laplacian Surface Deformation technique. The SOM technique smoothly deforms the projection contour and preserves the topology (connectivity).

In SOM, for each point of the input contour, the nearest point of the projection contour may be identified and partially pushed toward the contour point. The neighboring points of that particular projection point may also be pushed toward the input contour point. However, their motion is controlled by a specific neighborhood which is an exponential function whose value is high for the projection contour points that are closer to the winner and small for points which are farther away. The adaptation process lessens smoothly with time and controlled by another exponential function called learning rate. SOM gives the 2D-2D correspondence—template projection contour points—adapted template projection contour points between template projection contour 202 and adapted template projection contour 501.

From the 2D-2D correspondence, 3D-3D correspondence point pairs may be calculated for the silhouette vertices by the back projection method of FIG. 5. Using back projection, the adapted template projection points were back projected to find target positions of corresponding silhouette vertices. The silhouette vertices—their target positions—may be the 3D-3D point pairs. The 3D-3D point pairs may be used as positional constraints for LSD. The inputs of the LSD were the template mesh, the silhouette points which will act as the anchor points, and target positions of the silhouette points which were included in the 3D-3D point pairs. Each vertex of the mesh is represented by the differential coordinate that is a difference between the position of a vertex and the centroid of the neighboring vertices in the mesh. In LSD, the anchor points are forced towards their targets while preserving the differential property of the mesh vertices, causing smooth deformation with preservation of shape features.

Further in deformation, a matching point analysis may compute and provide at least a best matching point, for each of the template projection contour point(s) that correspond to the silhouette vertex position(s), on the input contour of the bone, such as 2D-2D correspondence using the SOM method. Deformation may further include constructing a correspondence map for converting points from the 2D projection of the template to a 3D format. The correspondence depends on the back projection mechanism and method.

After the initial alignment of the template model, a 2D-3D correspondence is determined between the defined points of the 2D input contour and the silhouette vertices of the aligned 3D template model for both ML and AP planes, potentially simultaneously. Using this 2D-3D correspondence, the silhouette vertices may be updated to new positions (target positions) such that their projection, i.e., template projection contour, matches with the input contour.

First, a 2D-2D correspondence between the points of template projection contour points and the input contour points is found. A non-rigid registration approach of SOM may be used instead of rigid registration-based method like ICP technique because the ICP technique can give wrong correspondence for complex contour shapes.

One of the non-rigid registration methods based on Kohonen self-organizing maps technique was successfully applied by Ferrarini et al. in their GAMEs approach to find 3D-3D shape correspondence, which is like example methods and embodiments to find 2D shape correspondence. The template projection contour points (pp) may be adapted onto the input contour points (pc) using the SOM technique. After the adaptation, the template projection contour points represent the shape of the input contour. The number of the template projection contour points and their topology (connectivity) is preserved in the SOM technique. Hence, the positions of the template projection contour points before and after the adaptation gives the required 2D-2D correspondence. The use of the SOM technique allows smooth changes in the shape formed by the template projection contour points.

In an example method, for each input contour point, a best matching template projection contour point ppwinner—a point nearest to the input contour point—may be determined and its position updated toward the input contour point. When the template projection contour adapts to the input contour, the motion of the best matching template projection contour point ppwinner affects a neighbor template projection contour points as well. This is controlled by the neighborhood function n(ppwinner, ppm), which is an exponential function whose value is high for the template projection contour points that are closer to the ppwinner and small for points which are farther away. The neighborhood function is responsible for topology preservation during the adaptation. The adaptation of all the projection contour points is performed with respect to every input contour point. The adaptation of every template projection contour point and its effect on the neighbor points decrease exponentially. This is controlled by the learning rate l(t), which is a function that makes the adaptation process die smoothly with time. In the system and method of this invention, the learning rate constant decreases from 0.5 to 0.1. The whole process, including adaptation of template projection contour points with respect to all the input contour points may also be repeated through number of cycles (iterations) until the MAD value between the points of template projection contour and their corresponding closest points of the input contour goes below a threshold, such as 0.15 mm for example.

The output of SOM technique is the adapted template projection contour points (pp1) onto the input contour. The template projection contour points before and after the adaptation represents the required 2D-2D correspondence. As the template projection contour points are directly associated with the silhouette vertices (projection), the 2D-2D correspondence showing which template projection contour point corresponds to which input contour point directly gives the required 2D-3D correspondence of which silhouette vertex of template corresponds to which input contour point.

Using the 2D-3D correspondence, the silhouette vertices may be updated to their target positions in such a way that their projections represent the shape of the input contours. The corresponding target positions vs1 of the $m^{th}$ silhouette vertices of the template with initial positions vs are determined using the same 3D-3D point pair calculating method (back projection) used for template alignment as shown in FIG. 5. For an $m^{th}$ adapted template projection contour point pmp1 lying on the input contour, a projection ray rm is determined starting from the X-ray point source meeting the point pmp1 itself. A new position vms1 closest to a corresponding $m^{th}$ silhouette vertex with initial position vsm is found on the updated projection ray. The new position vms1 is the target positions of the $m^{th}$ silhouette vertices. During template deformation, the silhouette vertices may be updated to their target positions, according to which all other vertices of the template are also updated while preserving the overall shape features. This procedure of template deformation is carried out using Laplacian surface deformation. In an example of deformation, a projection and positioning may back-project each of the best matching point(s) to find a position on the back-projected X-ray that is closer to the corresponding silhouette vertices where the target position of each silhouette vertex: 3D-3D correspondence.

Figure 11:
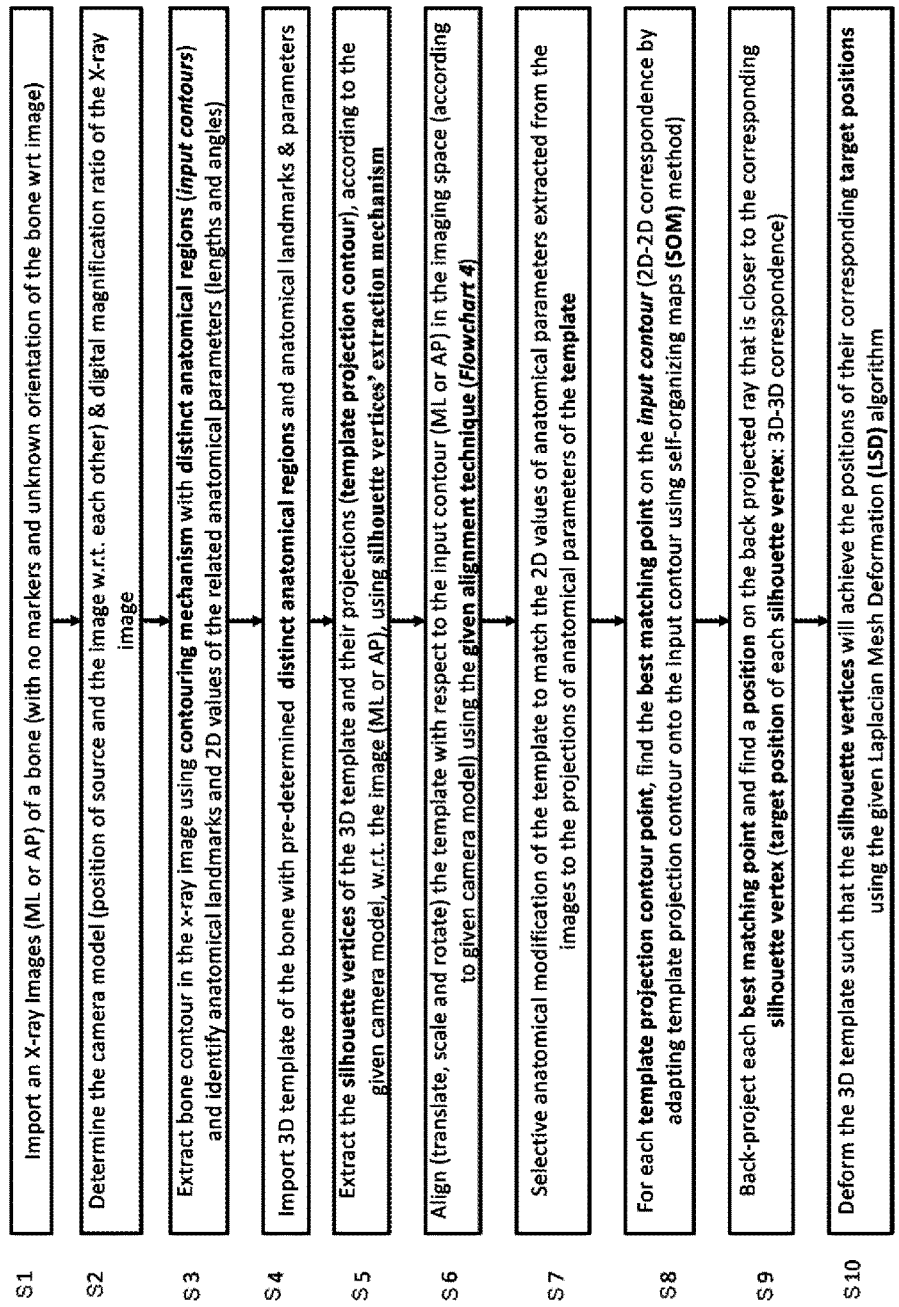
FIG. 11 is a flowchart of an example method of 3D image reconstruction from a single X-ray image.

FIG. 11 illustrates a flowchart of 3D image reconstruction from a single X-ray image. As shown in FIG. 11 A first X-ray is taken keeping the bone in its first pre-determined position with the X-ray source to image distance being known. Typically, the first pre-determined position for the first X-ray is such that an anterior-posterior X-ray is taken. A second X-ray is taken keeping the bone in its second pre-determined position with the X-ray source to image distance being known. Typically, the second pre-determined position for the second X-ray is such that a medial-lateral X-ray is taken. Typically, the second X-ray is orthogonally angularly displaced with respect to the first X-ray, about the axis of the bone.

Figure 12A:
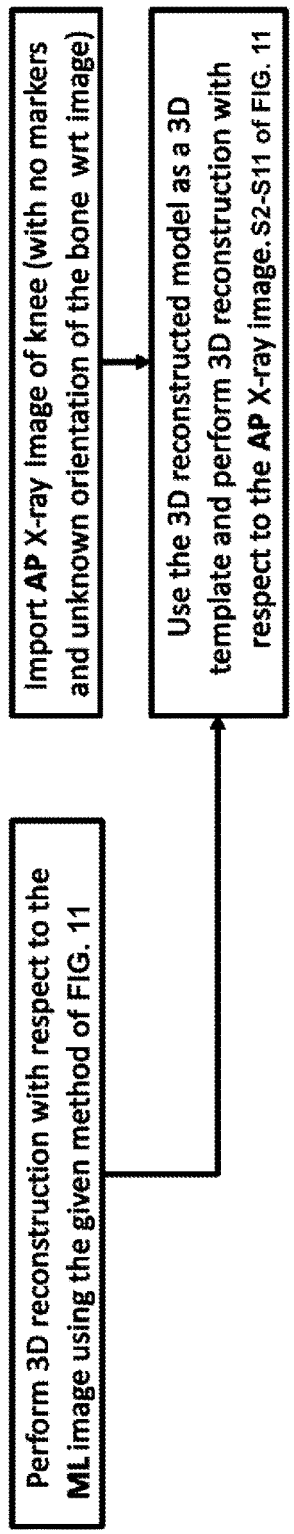
FIG. 12A is a flowchart of an example method of 3D image reconstruction and template deformation separately with respect to ML and then AP x-ray image.
Figure 12B:
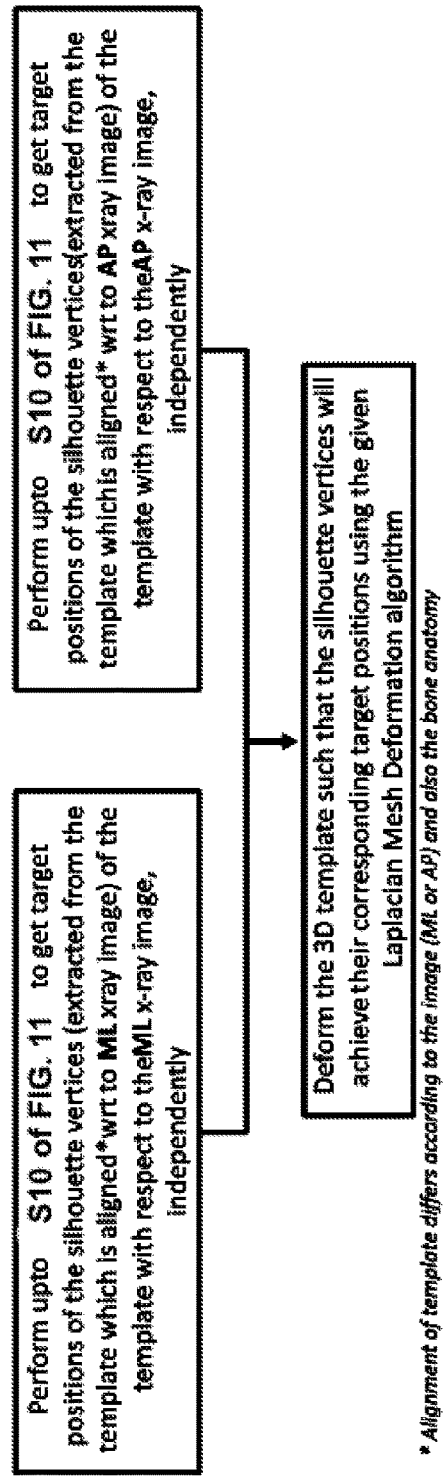
FIG. 12B is a flowchart of an example method of the 3D image reconstruction and template deformation simultaneously with respect to ML and then AP x-ray image.

FIG. 12A illustrates an example method of 3D image reconstruction and template deformation separately with respect to ML and then AP X-ray image. FIG. 12B illustrates an example method of the 3D image reconstruction and template deformation simultaneously with respect to ML and then AP X-ray image. FIG. 13 illustrates an example method of determining alignment of the template with respect to the input X-ray image. FIG. 14 illustrates an example method of 3D image reconstruction from a two Orthogonal X-ray image.

Example systems and methods may include view manipulation to manipulate views of the rendered and deformed 3D template. This may enable a user to carry out any or more of: rotate, pan, zoom the view using touch based user input; display or hide individual bones, such as display or hide femur from knee joint, using touch based inputs; cut sectional view of each bone; and/or change color and transparency of individual bone using touch based inputs. A user or a surgeon may virtually plan a surgery using the manipulate views of the rendered and deformed 3-dimensional template. Surgery planning tools may allow the user or the surgeon to plan the surgery, virtually. A surgeon can now use the 3D view of the bone/joint anatomy to plan certain surgeries by manipulating the 3D bone models or importing 3D models of bone implants (depending on the surgery) onto the rendered image. The manipulations May include: rotate/translate the 3D bone model about/along all the 3 axes of the Cartesian coordinate system using touch inputs; resect/Cut the bone into segments and rotate or translate the individual segments using various options provided; select the landmark points (regions) on the 3D bone surface; and/or import 3D models (in STL format) of bone implants onto the 3D interface of the software application.

Example systems and methods may thus enhance portability. Conventional process of planning the surgery use hard copies of X-ray image of the particular region of the patient's body which has to be operated and does not allow a surgeon to simulate the post-operative conditions and it is inconvenient for measurements. Example embodiments and methods use digital X-ray images that can be handled on a portable tablet; a portable method of surgery planning where the surgery plan/simulation can be easily referred during the surgery in the operation theatre. Example systems and methods allow planning of the surgery in 3D view of bone/joint anatomy, which requires only 2-dimensional X-ray images of a patient. Prior art techniques to obtain a 3D model of bones uses CT scans as input and patient has to undergo CT scanning. Thus, example systems and methods require only low cost 2D X-ray images which have about 20 times less cost than a CT scan, the input X-ray images can be acquired by the normal routine procedure of X-ray images with conventional single view imaging equipment; biplanar X-ray imaging equipment or exact orthogonal views of images are not required; 2D X-ray images have around 500 times less radiation than CT scans, lessening patient exposure; 2D X-ray imaging equipment is more prevalent and less expensive than CT scan equipment; and CT scan data is much larger, complicating handling and communication. The ability to use example systems and methods on smaller or tablet devices helps in accurate planning/simulation of the surgery; the tablet interface enables a portable process with a touch-based user interface with easier interactive, touch-based 3D view manipulation of 3D models and views. Case studies can be easily saved in the mobile tablet device and can be shared and archived and 3D models can be printed. Example methods of 2D to 3D conversion based on Laplacian deformation may provide a more efficient shape deformation technique.

Some example methods being described here, it is understood that one or more example methods may be used in combination and/or repetitively to produce multiple options and functionalities for users of communications devices. Example methods may be performed through proper computer programming or hardware configuring of networks and communications devices to receive augmented reality, origin, and limitation information and act in accordance with example methods, at any number of different processor-based devices that are communicatively connected. Similarly, example methods may be embodied on non-transitory computer-readable media that directly instruct computer processors to execute example methods and/or, through installation in memory operable in conjunction with a processor and user interface, configure general-purpose computers having the same into specific communications machines that execute example methods.

Example methods and embodiments thus being described, it will be appreciated by one skilled in the art that example embodiments may be varied through routine experimentation and without further inventive activity. For example, example embodiments have been described in connection with leg bones, it is understood that vastly different anatomy may be used in the same. Variations are not to be regarded as departure from the spirit and scope of the exemplary embodiments, and all such modifications as would be obvious to one skilled in the art are intended to be included within the scope of the following claims.

What is claimed is:

1. A method for obtaining a 3-dimensional image using at least one conventional 2-dimensional X-ray image, the method comprising:

acquiring an X-ray image of a bone;

determining a camera model of the X-ray image, wherein the determining uses known parameters to determine spatial values of an X-ray source and the bone;

extracting a contour of the bone from the X-ray image, wherein the contour includes distinct anatomical regions;

identifying anatomical values of the contour, wherein the anatomical values are 2-dimensional anatomical values from the distinct anatomical regions;

importing a 3-dimensional template and template anatomical values, all corresponding to the bone;

extracting silhouette vertices and silhouette vertex projections of the 3-dimensional template based on the camera model and an initial alignment of the 3-dimensional template;

aligning the 3-dimensional template with respect to the X-ray image;

projecting the 3-dimensional template on to an image plane, using the camera model, to obtain a 2-dimensional projection model;

modifying the aligned template to match the 2-dimensional anatomical values;

determining a best matching point on the contour, for each extracted silhouette vertex projection, for 2-dimensional to 2-dimensional correspondence of each silhouette vertex projection to the contour;

back-projecting each of the best matching points according to the camera model to form a back projected ray formed by the X-ray source and the best matching point;

determining target positions, wherein the target positions are a closest position to a corresponding silhouette vertex on each of the back projected rays; and deforming the 3-dimensional template such that the silhouette vertices achieve the target positions to obtain a 3-dimensional reconstructed image.

2. The method of claim 1, wherein the camera model includes spatial parameters and spatial values relating to the source, an object, an image, and a plane.

3. The method of claim 1, wherein the anatomical values include at least one of, spatial values per landmark, correlation between spatial values per landmark, and parameters defined by spatial values per landmark.

4. The method of claim 1, wherein the determining the camera model includes at least one of,
determining a position of the source and the X-ray image with respect to each other;
determining the camera model by determining a magnification factor of the X-ray image, and
determining the camera model using at least position of the source with respect to the X-ray image.

5. The method of claim 1, wherein extracting the contour includes determining and digitizing spatial values of contours of the bone of the X-ray image.

6. The method of claim 1, wherein the identifying anatomical values includes determining length values and angle values.

7. The method of claim 1, wherein the determining the camera model includes,
determining the image plane where a projection of the bone is formed in a 3D imaging space that corresponds to a detector plane, wherein the detector plane is a plane coinciding with a flat X-ray sensor panel or a film of a real imaging environment,
determining an image center as a central position of a rectangular detector,
determining position of the X-ray source with respect to the image plane in an imaging space, and
determining a distance between a centroid of the bone and the X-ray source in a direction normal to the image plane in the imaging space.

8. The method of claim 1, wherein the determining the camera model includes,
determining a position of the X-ray source with respect to an image center in such a way that a normal of the image plane arising from the image center coincides the source and at a known distance from the image center,
determining a source film distance as a distance between the X-ray source and a detector along a direction normal to a detector plane,
determining a source object distance between the X-ray source and a centroid of the bone, wherein the centroid is an average position of all the surface points of the bone along the direction that is normal to the image plane, and
determining a perspective ratio as a ratio of the source object distance to the source film distance.

9. The method of claim 8, wherein the determining the source object distance includes,
placing a spherical ball marker with a known actual diameter near the bone during X-ray imaging at a height from the detector plane that is closer to the height of the centroid from the detector plane,
computing a source object distance as a multiplication of the source film distance and the ratio of the known actual diameter of the spherical ball marker to the diameter of a projection of the spherical ball marker on the detector plane,
determining a diameter of the projection of the spherical ball marker on the detector plane as equal to a diameter of the projection of the spherical ball marker measured on the X-ray image multiplied by a digital magnification ratio, wherein the digital magnification ratio is a ratio of a value of a distance between the positions of projections of any two points on a surface of the bone on the detector plane to a value of a distance between the corresponding points as measured in the X-ray image, wherein the digital magnification ratio is determined by a circular coin marker with known actual diameter placed on the detector while taking the X-ray image and being approximately equal to a ratio of the actual diameter of the circular coin to a diameter of the coin as visible on the X-ray image.

10. The method of claim 1, wherein the determining anatomical values includes,
determining the distinct anatomical regions, wherein the anatomical values are 2-dimensional positions of unique anatomical features in the X-ray image in the distinct anatomical regions,
determining the anatomical values based on the distinct anatomical regions, wherein the anatomical values are values of geometric parameters calculated from anatomical landmarks for use in a 3-dimensional reconstruction,
dividing points of contour of the bone into subsets so that points of the subset correspond to the distinct anatomical regions of the bone, and
determining axes based on the anatomical regions by specifying two points on the X-ray image that lie on one of the axes and determining a line along a position and orientation of the one axis.

11. The method of claim 1, wherein the determining anatomical values includes, dividing points of contour of the bone into subsets so that points of the subset correspond to distinct anatomical regions of the bone, and determining axes based on the anatomical regions by geometric calculation on distinguished anatomical regions of the contour and determining positions of anatomical values on the X-ray image with respect to the contour on the basis of the anatomical regions.

12. The method of claim 1, wherein the determining anatomical values includes calculating anatomical parameters on the basis of anatomical landmarks, wherein the anatomical parameters are at least one of, a distance between two of the anatomical landmarks, an angle between lines defined by two of the anatomical landmarks, and a correlative value between the anatomical landmarks.

13. The method of claim 1, wherein the determining anatomical values includes determining anatomical regions, axes, anatomical landmarks, and anatomical parameters of the 3D template model, wherein the anatomical regions correspond to regions distinguished in the contour of the X-ray image, wherein the anatomical landmarks of the 3-dimensional template are the same as the anatomical landmarks of the contour.

14. The method of claim 1, wherein the importing the 3-dimensional template includes providing a corresponding bone template model in 3-dimensional format, and wherein the corresponding bone template model format belongs to a clinically normal bone in the form of 3D mesh with triangular elements.

15. The method of claim 1, wherein the 3-dimensional template is formed in the form of mesh created from a CT scan of a healthy subject with average weight and height.

16. The method of claim 1, wherein the 3-dimensional template is formed in the form of mesh from a CT scan of a healthy subject with average weight and height, the method further comprising:

creating a 3-dimensional surface model by segmenting sliced images of the CT, wherein the surface model is a point cloud surface model with connectivity between points of the point cloud surface model forming a 3D mesh model with triangular elements of connectivity between three points, wherein the mesh is formed by triangulation of all points of the point cloud surface model; and sampling the point cloud surface model to reduce a number of surface points and the triangular elements in the mesh.

17. The method of claim 1, wherein the extracting silhouette vertices includes determining those vertices of the 3-dimensional template that form an outer contour of a projection of the 3-dimensional template on the image plane, according to the camera model.

18. The method of claim 1, wherein the extracting silhouette vertices includes determining those vertices of the 3-dimensional template that form an outer contour of a projection of the 3-dimensional template on the image plane, according to the camera model, wherein the outer contour is computed by, projecting all vertices of the 3-dimensional template on the image plane, obtaining triangulation meshing of the projection using Delaunay triangulation, creating a 2-dimensional mesh with triangular elements using constraint Delaunay triangulation from the projection, and identifying edges of the triangular elements shared with only one triangular element, wherein the identified edges are boundary edges and the projected points corresponding to the identified edges are boundary points.

19. The method of claim 1, the method comprising further steps of:

obtaining a first set of target positions for a first set of silhouette vertices extracted from the 3-dimensional template aligned with respect to a first known view;

obtaining a second set of target positions for a second set of silhouette vertices extracted from the 3-dimensional template aligned with respect to a second known view; and deforming the 3-dimensional template such that a position of the first set of silhouette vertices matches the first set of target positions and such that the position of the second set of silhouette vertices matches the second set of target positions.

20. A method for obtaining a 3-dimensional image using a conventional 2-dimensional X-ray image, the method comprising:

acquiring a first X-ray image of a bone in a first view;

performing a 3-dimensional reconstruction with respect to the first view using the to obtain a first 3-dimensional reconstructed image;

acquiring a second X-ray image of the bone in a second view; and performing a 3-dimensional reconstruction with respect to the second view using the first 3-dimensional reconstructed image as a template and to obtain a second 3-dimensional reconstructed image, wherein the performings each include, for the corresponding X-ray image, determining a camera model of the X-ray image, wherein the determining uses known parameters to determine spatial values of an X-ray source and the bone, extracting a contour of the bone from the X-ray image, wherein the contour includes distinct anatomical regions, identifying anatomical values of the contour, wherein the anatomical values are 2-dimensional anatomical values from the distinct anatomical regions, importing a 3-dimensional template and template anatomical values, all corresponding to the bone, extracting silhouette vertices and silhouette vertex projections of the 3-dimensional template based on the camera model and an initial alignment of the 3-dimensional template, aligning the 3-dimensional template with respect to the X-ray image, projecting the 3-dimensional template on to an image plane, using the camera model, to obtain a 2-dimensional projection model, modifying the 3-dimensional template to match the 2-dimensional anatomical values, determining a best matching point on the contour, for each silhouette vertex projection, for 2-dimensional to 2-dimensional correspondence of each silhouette vertex projection to the contour, back-projecting each of the best matching points according to the camera model to form a back projected ray formed by the X-ray source and the best matching point, determining target positions, wherein the target positions are a closest position to a corresponding silhouette vertex on each of the back projected rays, and deforming the 3-dimensional template such that the silhouette vertices achieve the target positions to obtain a 3-dimensional reconstructed image.

21. The method of claim 20, wherein the first view and the second view are orthogonal to each other, the method further comprising:
determining a combined camera model based on individual camera models of the X-ray images of the first and the second views, wherein a template position with respect to the X-ray images is found by matching two template projection contours calculated based on the X-ray images according to the two camera models using shape registration.

22. The method of claim 20, wherein the first view and the second view are orthogonal to each other, and wherein,
the identifying anatomical values includes calculating 3-dimensional values of the anatomical values using the 2-dimensional values from the first X-ray image and from the second X-ray image,
the modifying the 3-dimensional template to match the identified 2-dimensional values include matching 3-dimensional values of corresponding identified anatomical parameters of the 3-dimensional template to the identified 3-dimensional values of anatomical parameters from the first and the second X-ray images,
the identifying anatomical values includes calculating 3-dimensional values of the anatomical values using the 2-dimensional values from the first X-ray image and from the second X-ray image, and
modifying includes modifying of the aligned 3-dimensional template to match the calculated 3-dimensional values to identified anatomical values of the 3-dimensional template.

23. The method of claim 20, wherein the aligning the 3-dimensional template of the bone with respect to the X-ray image includes,
mapping the 3-dimensional template with the X-ray image,
extracting at least two position values of identifiable landmarks from the X-ray image,
extracting corresponding landmark vertices from the corresponding 3-dimensional template,
calculating projections of the landmark vertices on an image plane obtained from the camera model,
calculating contour ratio of inter-landmark distance, from the contour, along a direction with respect to at least one anatomical axis of the bone,
calculating template projection ratio of inter-landmark distance, from the projection of the 3-dimensional template, along a direction with respect to the anatomical axis of the bone,
angularly displacing the 3-dimensional template about an axis which is orthogonal to the anatomical axis so that the template projection ratio matches the input contour ratio to define angular displacement requirement,
calculating a contour of the template projection contour, and
angularly displacing the 3-dimensional template about an axis normal to the image plane to obtain a best fit of the template projection contour to the input contour.

24. The method of claim 23, wherein the angularly displacing the 3-dimensional template uses method.

25. The method of claim 23, wherein the mapping the 3-dimensional template includes,
angularly displacing the 3-dimensional template about an axis which is normal to the image plane, such that any anatomical axis calculated for the projection contour matches principal axes for the input contour,
translating the 3-dimensional template such that centroid of the projection contour matches centroid of the input contour, and
if the contour is incomplete, truncating the 3-dimensional template to match aspect ratio of its projection with that of the contour extracted from the X-ray image.

26. A system for obtaining a 3-dimensional image using at least one conventional 2-dimensional X-ray image, the system comprising:
an inputter configured to acquire an X-ray image of a bone;
a camera model determinator configured to determine a camera model of the X-ray image, wherein the determining uses known parameters to determine spatial values of an X-ray source and the bone;
a contourer configured to extract a contour of the bone from the X-ray image, wherein the contour includes distinct anatomical regions and identify anatomical values of the contour, wherein the anatomical values are 2-dimensional anatomical values from the distinct anatomical regions;
an importer configured to import a 3-dimensional template and template anatomical values, all corresponding to the bone;
a silhouette vortex extractor configured to extract silhouette vertices and silhouette vertex projections of the 3-dimensional template based on the camera model and an initial alignment of the 3-dimensional template;
an aligner configured to align the 3-dimensional template with respect to the X-ray image;
a first estimator configured to project the 3-dimensional template on to an image plane, using the camera model, to obtain a 2-dimensional projection model;
a selective anatomical modifier configured to modify the 3-dimensional template to match the 2-dimensional anatomical values;
a second estimator configured to determine a best matching point on the contour, for each silhouette vertex projection, for 2-dimensional to 2-dimensional correspondence of each silhouette vertex projection to the contour, back-project each of the best matching points according to the camera model to form a back projected ray formed by the X-ray source and the best matching point, and determine target positions, wherein the target positions are a closest position to a corresponding silhouette vertex on each of the back projected rays; and
a deformer configured to deform the 3-dimensional template such that the silhouette vertices achieve the target positions to obtain a 3-dimensional reconstructed image.

* * * * *